United States Patent
Dharmarajan et al.

(10) Patent No.: US 7,105,603 B2
(45) Date of Patent: *Sep. 12, 2006

(54) HIGH IMPACT POLYMER COMPOSITIONS

(75) Inventors: Narayanaswami Raja Dharmarajan, Houston, TX (US); Michael Glenn Williams, Humble, TX (US); Sudhin Datta, Houston, TX (US); Prasadarao Meka, Seabrook, TX (US); Srivatsan Srinivas, Pearland, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/896,549

(22) Filed: Jul. 21, 2004

(65) Prior Publication Data

US 2005/0054781 A1    Mar. 10, 2005

Related U.S. Application Data

(63) Continuation-in-part of application No. 10/688,091, filed on Oct. 17, 2003.
(60) Provisional application No. 60/419,183, filed on Oct. 17, 2002.

(51) Int. Cl.
*C08F 8/08* (2006.01)
*C08L 23/00* (2006.01)
*C08L 23/04* (2006.01)

(52) U.S. Cl. ..................... 525/191; 525/240

(58) Field of Classification Search ............. 525/191, 525/240
See application file for complete search history.

(56) References Cited

U.S. PATENT DOCUMENTS

| 5,011,891 | A |   | 4/1991  | Spenadel et al. ........... 525/211 |
| 5,959,030 | A |   | 9/1999  | Berta ........................... 525/64 |
| 6,232,402 | B1 |  | 5/2001  | Demeuse .................... 525/191 |
| 6,245,856 | B1 |  | 6/2001  | Kaufman et al. ........... 525/240 |
| 6,342,565 | B1 | * | 1/2002  | Cheng et al. ............... 525/191 |
| 6,642,316 | B1 | * | 11/2003 | Datta et al. ................. 525/240 |
| 6,852,424 | B1 | * | 2/2005  | Dharmarajan et al. ...... 428/516 |

FOREIGN PATENT DOCUMENTS

| EP | 0 792 914   | 9/1997 |
| WO | WO 97/20888 | 6/1997 |
| WO | 00/01766    | 1/2000 |

* cited by examiner

*Primary Examiner*—Nathan M. Nutter

(57) ABSTRACT

Disclosed herein are various compositions that have particular utility in automotive components, including compositions that include: (a) polypropylene having a melting point of 110° C. or more; (b) ethylene α-olefin polymer in which the α-olefin is $C_4$ or higher; and (c) propylene polymer, having 60 wt % or more units derived from propylene, including isotactically arranged propylene derived sequences and a heat of fusion less than 45 J/g.

26 Claims, No Drawings

HIGH IMPACT POLYMER COMPOSITIONS

RELATED APPLICATIONS

This application is a continuation-in-part of co-pending U.S. patent application Ser. No. 10/688,091, filed Oct. 17, 2003, which claims the benefit of U.S. Provisional Application No. 60/419,183, filed Oct. 17, 2002, the entire disclosures of which are hereby incorporated by reference.

FIELD

The invention relates to hetero phase compositions, such as thermoplastic olefin (TPO) compositions, for use, among other uses, in the manufacture of automotive components, and for use in articles made from such compositions.

BACKGROUND

Embodiments of our invention relate to hetero phase polymer compositions having three main polymeric components comprising a polypropylene component, a modifier component and a compatibilizer component. The compatibilizer component typically imparts a greater degree of compatibility between the polypropylene component and modifier component phases, yielding improved physical properties, notably impact strength. Non-polymeric components may also be present in the compositions.

The term hetero phase polymer compositions refers to the presence of at least two phases: a continuous or matrix phase and a discontinuous or dispersed phase distributed within the matrix phase.

Hetero phase polymer compositions include compositions generally referred to as Thermoplastic Olefin (TPO) Compositions, which are blends of polypropylene, modifier and optionally, non-polymeric components such as fillers and other compounding ingredients. TPOs are multiphase polymer blends where the polypropylene forms a continuous matrix phase and the modifier component, generally derived from an ethylene containing interpolymer, is the dispersed phase. The polypropylene matrix imparts tensile strength and chemical resistance to the TPO, while the ethylene polymer imparts flexibility and impact resistance. Generally speaking, TPOs have a dispersed phase which is not, or only modestly, cross-linked.

Hetero phase polymer compositions also include compositions generally referred to as thermoplastic vulcanizates (TPVs), which are also blends of polypropylene, modifier and optionally non-polymeric components such as fillers and other compounding ingredients, with the exception that thermoplastic vulcanizates are multiphase polymer blends where the dispersed modifier component is cross-linked or "vulcanized" to provide a rubber-like resilience to the composition. As a result of the increased coherence of the dispersed, crosslinked modifier, its share of the total composition may be increased to levels higher than for TPO's.

Traditionally, highly amorphous, very low density ethylene-propylene copolymers (EP) and ethylene-propylene-diene terpolymers (EPDM) have been used as the modifier component in hetero phase compositions. These EPs or EPDMs generally have a high viscosity expressed in Mooney units. The major market for TPOs is in the manufacture of automotive parts, especially bumper fascia. Other applications include automotive interior components such as door skin, air bag cover, side pillars and the like. These parts are generally made using an injection molding processes. To increase efficiency and reduce costs it is necessary to decrease molding times and reduce wall thickness in the molds. To accomplish these goals, manufacturers have turned to high melt flow polypropylenes (Melt Flow Rate>35 g/10 min.). These high melt flow rate (MFR) resins are low in molecular weight and consequently difficult to toughen, resulting in aforementioned products that have low impact strength.

SUMMARY

Disclosed herein is a composition that includes: (a) polypropylene having a melting point of 110° C. or more; (b) ethylene α-olefin polymer in which the α-olefin is $C_4$ or higher; and (c) propylene polymer, having 60 wt % or more units derived from propylene, including isotactically arranged propylene derived sequences and further having a heat of fusion less than 45 J/g or a melting point less 105° C. or both.

Also disclosed is a composition comprising: (a) polypropylene having a melting point of 110° C. or more; (b) ethylene α-olefin polymer in which the α-olefin is $C_4$ or higher; and (c) propylene polymer, having 60 wt % or more units derived from propylene, including isotactically arranged propylene derived sequences and further having a heat of fusion less than 45 J/g or a melting point less 105° C. or both, wherein the composition has: (d) a Notched Izod @ 21° C. of 2.5 or more; and (e) F2 greater than 3.6736 $(MFR@230\ C)^{-1.2229}$, wherein F2 is defined as (Notched Izod)×(wt % $C_2$–8.5)$^2$/[(wt % EE–18)$^{3.5}$].

Also disclosed is a composition comprising: (a) polypropylene having a melting point of 110° C. or more; (b) a random ethylene α-olefin polymer in which the α-olefin is $C_4$ or higher; and (c) propylene polymer, having 60 wt % or more units derived from propylene, including isotactically arranged propylene derived sequences and further having a heat of fusion less than 45 J/g or a melting point less 105° C. or both.

Also disclosed is a composition comprising: (a) polypropylene having a melting point of 110° C. or more; (b) ethylene α-olefin polymer in which the α-olefin is $C_4$ or higher, having no more than 1 wt % units derived from a diene; and (c) propylene polymer, having 60 wt % or more units derived from propylene, including isotactically arranged propylene derived sequences and further having a heat of fusion less than 45 J/g or a melting point less 105° C. or both.

Also disclosed is a composition comprising: (a) polypropylene having a melting point of 110° C. or more, present in the composition in an amount greater than 70 wt %; (b) ethylene α-olefin polymer in which the α-olefin is $C_4$ or higher; (c) propylene polymer, having 60 wt % or more units derived from propylene, including isotactically arranged propylene derived sequences and further having a heat of fusion less than 45 J/g or a melting point less 105° C. or both; (d) Melt Flow Rate of about 20 g/10 min. or more; (e) Notched Izod of about 2.5 ft-lb/in or more; and (f) Flexural Modulus of about 100 kpsi or more.

Also disclosed is a composition comprising: (a) a continuous phase and a dispersed phase, (b) a thermoplastic component present in at least a portion of the continuous phase that includes polypropylene having a melting point of 110° C. or more; (c) an elastomeric component present in at least a portion of the dispersed phase that includes an ethylene α-olefin polymer in which the α-olefin is $C_4$ or higher; (d) propylene polymer, having 60 wt % or more units derived from propylene, including isotactically arranged propylene derived sequences and a heat of fusion less than 45 J/g or a melting point less than 105° C. or both; (e) Melt Flow Rate of about 20 g/10 min. or more, measured according to ASTM-1238 @ 230° C. using 2.16 kg; (f) Notched Izod of about 2.5 ft-lb/in or more; and (g) Flexural Modulus of about 100 kpsi or more.

Also disclosed is composition comprising: (a) a polypropylene component, present in said composition as a continuous phase, said polypropylene component having a melting point Tm≧110° C., said polypropylene component present in said composition in an amount of 70 wt % or more; (b) a modifier component, said modifier component being a dispersed phase in said hetero phase polymer composition, said modifier component comprising at least 50 percent by weight of the total modifier component being an ethylene α-olefin polymer in which the α-olefin is $C_4$ or higher and in which the density is less than 0.9 g/ml; and (c) a compatibilizer component, present in said hetero phase polymer composition in a compatibilizing amount, said compatibilizer having a Δ Hf<45 J/g, said compatibilizer component having propylene derived sequences co-crystallizable with the polypropylene component of (a).

Also disclosed is a composition having: (a) a continuous phase and a dispersed phase, (b) a thermoplastic component present in at least a portion of the continuous phase that includes polypropylene having a melting point of 110° C. or more; (c) an elastomeric component present in at least a portion of the dispersed phase that includes an ethylene α-olefin polymer in which the α-olefin is $C_4$ or higher; (d) propylene polymer, having 60 wt % or more units derived from propylene, including isotactically arranged propylene derived sequences and a melting point less than 105° C.; (e) Melt Flow Rate of about 20 g/10 min. or more, measured according to ASTM-1238 @ 230° C. using 2.16 kg; (f) Notched Izod of about 2.5 ft-lb/in or more; and (g) Flexural Modulus of about 100 kpsi or more.

Also disclosed is a composition that is a hetero phase polymer composition comprising: (a) a polypropylene component, present in said hetero phase polymer composition as a continuous phase, said polypropylene component having a melting point Tm≧110° C., said polypropylene component present in said hetero phase polymer composition in an amount of 70 wt % or more; (b) a modifier component, said modifier component being a dispersed phase in said hetero phase polymer composition, said modifier component comprising at least 10 percent by weight of the total modifier component being an ethylene α-olefin polymer in which the α-olefin is $C_4$ or higher; and (c) a compatibilizer component, present in said hetero phase polymer composition in a compatabilizing amount, said compatibilizer having a Δ Hf<45 J/g, said compatabilizer component having propylene derived sequences co-crystallizable with the polypropylene component of (a).

Also disclosed is a composition, which preferably forms part of an automotive article that is an automotive bumper fascia, that includes: (a) polypropylene having a melting point of 110° C. or more, present in the composition in an amount greater than 70 wt % ; (b) ethylene α-olefin polymer in which the α-olefin is $C_4$ or higher; (c) propylene polymer, having 60 wt % or more units derived from propylene, including isotactically arranged propylene derived sequences and a melting point less than 105° C.; (d) pigment; (e) one or more additives, (f) Melt Flow Rate of about 20 g/10 min. or more; (g) Notched Izod of about 2.5 ft-lb/in or more; and (h) Flexural Modulus of about 100 kpsi or more.

Also disclosed is a composition comprising a two phase polymer blend comprising: (a) a polypropylene component present as a continuous phase, said polypropylene component having a Tm>110° C. or a Δ Hf>60 J/g, and wherein said polypropylene component has crystallinity from one of isotactic or syndiotactic sequences; (b) a modifier component, present in said polymer blend at ≦10 weight percent, based on the total polymer weight of said blend, said modifier component having a density in the range of from 0.85–0.965 g/cm³; and (c) a compatibilizer component, present in said blend at a compatibilizing amount, said compatibilizer component having a Δ0 Hf<45 J/g, said compatibilizer component having propylene sequences that co-crystallize with the polypropylene component of (a).

Also disclosed is a composition comprising a hetero phase polymer composition, comprising: (a) a polypropylene having polypropylene crystallinity, due to the presence of one of isotactic or syndiotactic sequences in said polypropylene; (b) an ethylene α-olefin polymer being substantially free from propylene crystallinity, having a density of ≧0.905 g/cm³; and (c) a polymer compatibilizer having propylene crystallinity substantially the same as that in (a).

Also disclosed is a composition comprising a two phase polymer composition, comprising: (a) an impact copolymer of propylene (ICP), said ICP having one or more of Tm>140° C., Δ Hf>95 J/g, or an α-olefin content of one of >2 or <25 weight percent, a molecular weight in the range of from 10,000–5,000,000, a melt flow rate in the range of from 15–60 dg/min., said ICP present in said two phase polymer composition in the range of from 70–90 weight percent; (b) an ethylene α-olefin copolymer, wherein said α-olefin is one or more of butene-1, hexene-1, or octene-1, said ethylene copolymer having a density ≧0.905 g/cm³, said ethylene copolymer may be a blend of two or more ethylene α-olefin copolymers, and if a blend, the aggregate density is ≧0.905 g/cm³, said ethylene α-olefin copolymer being present in said two phase polymer composition in the range of from 15–22 weight percent, having an melt index in the range of from 0.1–10 g/10 minutes; and (c) a compatibilizer component present in said two phase polymer composition in he range of 0.1–8 weight percent, said compatibilizer component is a polymer of propylene and one or more of ethylene, butene-1, hexene-1, or octene-1, said compatibilizer component has a crystallinity defined by one of Tm<100° C., or a Δ Hf<25 J/g, wherein said compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component.

Also disclosed is a composition a hetero phase polymeric composition, comprising: (a) a polypropylene component present in said hetero phase polymer composition as a continuous phase, said polypropylene component having a melting point Tm≧100° C.; (b) a modifier component, ethylene α-olefin polymer component, said modifier component being a dispersed phase in said hetero phase polymer composition, and comprising at least 10% by weight of the total modifier component of an polymer derived from ethylene and an alpha-olefin having from 4 to 20 carbon atoms with a density of at least 0.88 g/cm³ and crystallinity sufficient for determination of the CDBI with a CDBI of at least 50%; and (c) a compatibilizing amount of a compatibilizer component, derived to an extent of at least 50 mole % of propylene compatibilizer component and having a Δ Hf<45 J/g which is co-crystallizable with the polypropylene component.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Various terms as used herein are defined below. To the extent a term used in a claim is not defined below, it should be given the broadest definition or usage persons in the pertinent art have given that term as reflected in at least one printed publication or issued patent.

Certain composition features are described using a set of numerical upper limits and a set of numerical lower limits. It should be appreciated that ranges from any lower limit to any upper limit are contemplated unless otherwise indicated. Certain lower limits, upper limits and ranges appear in one or more claims.

All patents, test procedures, and other documents cited in this application are fully incorporated by reference to the extent such disclosure is not inconsistent with this application and for all jurisdictions in which such incorporation is permitted.

All numerical values are "about" or "approximately" the indicated value, and take into account experimental error and variations that would be expected by a person having ordinary skill in the art.

A. Definitions, Test Methods and Properties:

Comonomer content: The comonomer content and sequence distribution of the polymers can be measured using $^{13}C$ nuclear magnetic resonance (NMR) by methods well known to those skilled in the art. The NMR procedure can be used to obtain secondary analysis procedures for the comonomer content using procedures such as Fourier Transform Infrared Spectroscopy (FTIR) and density. Comonomer content of discrete molecular weight ranges can be measured using methods well known to those skilled in the art as described in Wheeler and Willis, Applied Spectroscopy, 1993, vol. 47, pp. 1128–1130.

In the particular case of propylene ethylene copolymer containing greater than 75 wt % propylene by weight the comonomer content of the polymers described herein can be measured as follows. A thin homogeneous film is pressed at a temperature of about 150° C. or greater, and mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt % $=82.585-111.987X+30.045X^2$, where X is the ratio of the peak height at 1155 $cm^{-1}$ and peak height at either 722 $cm^{-1}$ or 732 $cm^{-1}$, whichever is higher. The peaks reflect the propylene content and the amount of ethylene is determined by subtraction.

Polyene content: The amount of the polyene present in the polymeric components can be inferred by the quantitative measure of the amount of the pendant free olefin present in the polymer after polymerization. Several procedures such as iodine number and the determination of the olefin content by $^1H$ or $^{13}C$ NMR have been established. In the particular case where the polyene is ENB the amount of polyene present in the polymers described herein can be measured using ASTM D3900. The amount of polyene present is expressed on the basis of the total weight of ethylene and propylene derived units.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer bases on the total train content can be determined and when multiplied by 100 indicates the percentage of that type found in the polymer. The tacticity as used herein is the percentage of isotactic 'mm' triads. An ethylene propylene copolymer can have both a high ethylene content and high triad tacticity if the bulk of the propylene derived units are present in 'mm' triads.

Isotactic: The term "isotactic" is to be given the broadest definition reflected in at least one publication or issued patent, but specifically refers at least to any polymer having a polymer sequence in which greater than 50% of the pairs of pendant methyl groups located on adjacent propylene units, inserted into the chain is a regio regular 1,2 fashion, that are not part of the backbone structure are located either above or below the atoms in the backbone chain, when the latter are all in one plane. Certain combinations of polymers in blends or polymer sequences within a single polymer are described as having "substantially the same tacticity," which herein means that the two polymers are both isotactic according to the definition above.

Melting point and heat of fusion: The melting point (Tm) and heat of fusion of the polymers described herein can be determined by Differential Scanning Calorimetry (DSC), using the ASTM E-794-95 procedure. About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System) and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. In one embodiment of the present invention, the polymer has a single melting point. Typically, all samples of the polymeric components will show secondary melting peaks adjacent to the principal peak, which are considered together as a single melting point. The highest of these peaks is considered the melting point.

Molecular weight ($M_w$) and molecular weight distribution $M_w/M_n$ (PDI): The molecular weight ($M_w$) and molecular weight distribution $M_w/M_n$ (PDI) of the polymers described herein can be measured as follows. Molecular weight distribution (PDI) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight Mz/Mw. Measurement of $M_n$ and PDI is well known in the art and is discussed in more detail in, for example, Slade, P. E. Ed., Polymer Molecular Weights Part II, Marcel Dekker, Inc., NY, (1975) 287–368; Rodriguez, F., Principles of Polymer Systems 3rd ed., Hemisphere Pub. Corp., NY, (1989) 155–160; U.S. Pat. No. 4,540,753; Verstrate et al., Macromolecules, vol. 21, (1988) 3360; and references cited therein.

Mooney Viscosity: The Mooney Viscosity is a term used to characterize certain polymers, polymer components and polymer compositions herein. As used herein, the term "Mooney Viscosity" and "viscosity" or Mooney Viscosity (ML(1+4)@ 125° C.) is to be defined and measured according to the definition and measurement procedure set forth in U.S. Pat. No. 6,686,415, which is hereby incorporated by reference in its entirety, but particularly the text found in column 6, line 59 through column 7, line 59.

Intermolecular solubility distribution and intermolecular composition distribution: Homogeneous distribution is defined as a statistically insignificant intermolecular difference of both in the composition of the copolymer and in the tacticity of the polymerized propylene. For a copolymer to have a homogeneous distribution it must meet the requirement of two independent tests: (i) intermolecular distribution of tacticity; and (ii) intermolecular distribution of composition, which are described below. These tests are a measure of the statistically insignificant intermolecular differences of tacticity of the polymerized propylene and the composition of the copolymer, respectively. The intermolecular solubility distribution and intermolecular composition distribution of the polymers described herein can be measured according to the following procedure of thermal fractionation by controlled dissolution generally in a single solvent, at a series of slowly elevated temperatures. A typical solvent is a saturated hydrocarbon such as hexane or heptane. These controlled dissolution procedures are commonly used to separate similar polymers of different crystallinity due to differences in isotactic propylene sequences, as shown in the article in Macromolecules, Vol. 26, p2064 (1993). Nominally 30 grams of the polymer is cut into small cubes with about ⅛" (3 mm) sides. This is introduced into a thick-walled glass bottle with a screw cap closure, along with 50 mg of Irganox 1076, an antioxidant commercially available from Ciba-Geigy Corporation. Then, 425 mL of hexane (a principal mixture of normal and iso isomers) is added to the bottle and the sealed bottle is maintained at 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 mL and the bottle is maintained at 31° C. for 24 hours in a covered circulating water bath. The soluble polymer is decanted and an additional amount of hexane is added for another 24 hours at 31° C. prior to decanting. In this manner, fractions of the polymer soluble at 40° C., 48° C., 55° C. and 62° C. are obtained at temperature increases of approximately 8° C. between stages. Increases in temperature to 95° C. can be accommodated if heptane, instead of hexane, is used as the solvent for all temperatures above about 60° C. The term "adjacent fractions" refers to soluble fractions obtained in adjacent temperature increases. A polymer is said to have a "narrow intermolecular composition distribution" when at least 75 wt % of the polymer is isolated in two adjacent soluble fractions. For the polymers described herein, about 75%, or about 85% by weight of the polymer is isolated as one or two adjacent, soluble fractions with the balance of the polymer in immediately preceding or succeeding fractions.

In instances where the polymer is a copolymer of ethylene and propylene, the soluble polymer fractions are dried, weighed and analyzed for composition, as wt % ethylene content, by the IR technique described above. For the polymers described herein, each of the fractions has a composition (wt % comonomer) with a difference of no greater than 20% (relative), or no greater than 10% (relative), of the average wt % comonomer of the polymer.

An "additive" is defined as any material in the composition that is not an FPC, SPC or TPC, and in particular any non-polymer material. Any process oil or extender oil or polymeric material having a Mn of 10,000 or less, is considered to be an "additive" as the term is used herein, unless identified otherwise. A variety of additives may be incorporated, e.g., into an ICP, for various purposes. Such additives include, for example, stabilizers, antioxidants, fillers, colorants, nucleating agents and mold release agents. Primary and secondary antioxidants include, for example, hindered phenols, hindered amines, and phosphates. Nucleating agents include, for example, sodium benzoate and talc. Dispersing agents such as Acrowax C can also be included. Slip agents include, for example, oleamide and erucamide. Catalyst deactivators are also commonly used, for example, calcium stearate, hydrotalcite, and calcium oxide.

As used herein, all references to Notched Izod @ 21° C. or "Notched Izod" (without reference to temperature) is a reference to a mechanical property or characteristic measured in accordance with ASTM D 256 at 21° C., which is sometimes expressed as 21.5+/−1.5 C.

B. First Polymer Component

Each of the first polymer components ("FPCs") are propylene polymers, preferably polypropylene copolymers, having a heat of fusion less than 45 J/g. The FPC's described herein preferably have crystallinity derived from isotactic polypropylene sequences. The FPC isotacticty is illustrated by the presence of a preponderance of the propylene residues in the polymer in mm triads. Characteristics of certain FPCs are described below.

An FPC is preferably one of the "compatibilizer components" referenced herein, which in certain embodiments is present in the hetero phase polymer composition in a compatibilizing amount. For example, a compatibilizing amount includes an amount sufficient for the compatibilizer component not to form a separate phase or may also be an amount less than the amount of modifier component. A compatibilizing effect is evident if the average size of the dispersed phase regions is reduced in comparison with the same proportion of polypropylene component and modifier component combined without compatibilizer. This is shown in FIG. 1. Additionally, a compatibilizing amount can be determined as that amount that causes the impact strength, as determined by Notched Izod at 21.5+/−1.5 C, to rise ≧15%, or ≧20%, or ≧25%, or ≧30% over/above a blend not containing such compatibilizer.

In certain embodiments of our invention, the compatibilizer component may be present in the hetero phase polymer composition at ≧0.1, or ≧0.3, or ≧0.5, or ≧0.7, or ≧0.9, or ≧1, or <10 or ≦8, or ≦7, or ≦6, or ≦5 weight percent, based on the total polymer weight in the hetero phase polymer composition.

The crystallinity of an FPC can be expressed in terms of heat of fusion. The FPC of the invention can have a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 45 J/g, or 50 J/g, or 60 J/g, or 75 J/g. Without wishing to be bound by theory, we believe that the FPC of the invention has generally isotactic crystallizable propylene sequences, and the above heats of fusion are believed to be due to the melting of these crystalline segments. With the term "crystallizable propylene sequences," is meant sequences that are mainly amorphous in the undeformed state. Those are believed to possess intermediate numbers of adjacent propylene derived units; fewer than are present in regions that are crystalline and contribute to the heat of fusion as measured above, and more than any isolated propylene derived sequences that are present in amorphous regions incapable of crystallization. The presence of crystallizable sequences may be evident from added crystallization occurring upon stretching or annealing or in the presence of a crystalline polymer such as an SPC.

The crystallinity of an FPC may also be express in terms of crystallinity percent. The thermal energy for the highest order of polypropylene is estimated at 189 J/g. That is, 100% crystallinity is equal to 189 J/g. Therefore, certain FPCs of the invention have a polypropylene crystallinity within the range having an upper limit of 65%, or 40%, or 30%, or 25%, or 20%, and a lower limit of 1%, or 3%, or 5%, or 7%, or 8%.

The level of crystallinity can also be reflected in the melting point. An FPC of the invention can have a single melting point. Typically, a sample of propylene copolymer will show secondary melting peaks adjacent to the principal peak, which are considered together as a single melting point. The highest of these peaks is considered the melting point. An FPC of the invention can have a melting point by DSC within the range having an upper limit of 115° C., or 110° C., or 105° C., or 90° C., or 80° C., or 70° C., and a lower limit of 0° C., or 20° C., or 25° C., or 30° C., or 35° C., or 40° C., or 45° C.

An FPC of the invention can have a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (PDI), within the range having an upper limit of 40, or 20, or 10, or 5, or 4.5, and a lower limit of 1.5, or 1.8, or 2.0. Although any recognized, published test for obtaining weight average molecular weight may be used, including GPC methods, it is preferred to use ASTM test methods, e.g., ASTM D 3536-91 (1991) and ASTM D 5296-92 (1992), or the most current version of those tests.

In at least certain compositions, an FPC can have a homogeneous distribution, which, for our purposes, means that it must meet the requirement of two independent tests: (i) intermolecular distribution of tacticity; and (ii) intermolecular distribution of composition, which are described below. These tests are a measure of the statistically insignificant intermolecular differences of tacticity of the polymerized propylene and the composition of the polymer, respectively.

An FPC of the invention can have a statistically insignificant intermolecular difference of tacticity of polymerized propylene between different chains (intermolecularly.). This is determined by thermal fractionation by controlled dissolution generally in a single solvent, at a series of slowly elevated temperatures. A typical solvent is a saturated hydrocarbon such as hexane or heptane. These controlled dissolution procedures are commonly used to separate similar polymers of different crystallinity due to differences in isotactic propylene sequences, as shown in the article in Macromolecules, Vol. 26, p2064 (1993). For the FPC of the invention, we expected that this fractionation procedure will separate the molecules according to tacticity of the incorporated propylene. This procedure is described below.

In certain FPCs of the invention, at least 75% by weight, or at least 80% by weight, or at least 85% by weight, or at least 90% by weight, or at least 95% by weight, or at least 97% by weight, or at least 99% by weight of the polymer is soluble in a single temperature fraction, or in two adjacent temperature fractions, with the balance of the polymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

Fractionations have been done where boiling pentane, hexane, heptane and even di-ethyl ether are used for the fractionation. In such boiling solvent fractionations, polymers of embodiments of our invention will be totally soluble in each of the solvents, offering no analytical information. For this reason, we have chosen to do the fractionation as referred to above and as detailed herein, to find a point within these traditional fractionations to more fully describe our polymer.

The crystallinity and the melting point of an FPC can be reduced compared to highly isotactic polypropylene by the introduction of errors in the insertion of propylene. The presence of these errors can be detected by various characterization procedures. These procedures are described below.

The percentage of mm triads in an FPC of the invention, as determined by the method discussed above for determining triad tacticity, can in certain cases be in the range having an upper limit of 98%, or 95%, or 90%, or 85%, or 82%, or 80%, or 75%, and a lower limit of 50%, or 60%.

The crystallinity of an FPC of the invention can in certain cases be reduced by the copolymerization of propylene with limited amounts of one or more comonomers selected from: ethylene, $C_4$–$C_{20}$ alpha-olefins, and polyenes. In these copolymers, the amount of propylene-derived units present in the FPC ranges from an upper limit of 100%, or 97%, or 95%, or 94%, or 92%, or 90%, or 85% by weight, to a lower limit of 60%, 68%, or 70%, or 71%, or 75%, or 76%, or 80% by weight, based on the total weight of the FPC. The amount of optional units derived from ethylene and/or $C_4$–$C_{20}$ alpha-olefins present in the FPC ranges from an upper limit of 40%, or 30%, or 28%, or 25%, or 20%, or 15% by weight, to a lower limit of 0%, or 2%, or 5%, or 6%, or 8%, or 10% by weight, based on the total weight of the FPC. The amount of optional polyene-derived units present in the FPC ranges from an upper limit of 15%, or 10%, or 7%, or 5%, or 4.5%, or 3%, or 2.5%, or 1% by weight, to a lower limit of 0%, or 0.1%, or 0.2%, or 0.3%, or 0.5% by weight, based on the total weight of the FPC.

Specific examples of the optional $C_4$–$C_{20}$ alpha-olefins include, but are not limited to butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-I and hexadodecene-1.

The optional polyene may be any hydrocarbon structure having at least two unsaturated bonds wherein at least one of the unsaturated bonds is readily incorporated into a polymer. Examples of the optional polyene include, but are not limited to butadiene, pentadiene, hexadiene (e.g, 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyl-tetrahydroindene; dicyclopentadiene; bicyclo-(2.2.1)-hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo(A-11,12)-5,8-dodecene.

In embodiments of the invention where the composition of the FPC comprises ethylene, the FPC can have statistically insignificant intermolecular differences of composition, which is the ratio of propylene to ethylene between different chains (intermolecular). This compositional analysis is by infrared spectroscopy of the fractions of the polymer obtained by the controlled thermal dissolution procedure described above. Each of the fractions has a composition (wt % ethylene content) with a difference of less than 1.5 wt % (absolute) or less than 1.0 wt % (absolute), or less than 0.8 wt % (absolute) of the average wt % ethylene content of the whole polymer. Meeting such a fractionation requirement means that a polymer has statistically insignificant intermolecular differences of composition.

A copolymer FPC of the invention can be uniform, which, for our purposes, means that it must meet the requirement of two independent tests: (i) intramolecular distribution of tacticity; and (ii) intramolecular distribution of composition, which are described below. These tests are a measure of the statistically insignificant intramolecular differences of tacticity of the polymerized propylene and the composition of the polymer, respectively.

In embodiments of the invention where an FPC contains ethylene, the FPC has statistically insignificant intramolecular differences of composition, which is the ratio of propylene to ethylene along the segments of the same chain (intramolecular). This compositional analysis is inferred from the process used for the synthesis of these polymers, and can also be determined by $^{13}C$ NMR, which locates the comonomer residues and propylene insertion errors in relation to the neighbouring propylene residues.

An FPC of the invention can have statistically insignificant intramolecular differences of tacticity, which is due to isotactic orientation of the propylene units along the segments of the same chain (intramolecular). This compositional analysis is inferred from the results of a detailed analysis which includes differential scanning calorimetry, electron microscopy and relaxation measurement. In the presence of significant intramolecular differences in tacticity, we would form 'stereoblock' structures, as described below, where the number of isotactic propylene residues adjacent to one another is much greater than statistical.

C. Polymerization Processes

The preferred polymerization is a single stage, steady state, polymerization conducted in a well-mixed continuous feed polymerization reactor. The polymerization can be conducted in solution, although other polymerization procedures such as gas phase or slurry polymerization, which fulfil the requirements of single stage polymerization and continuous feed reactors, are contemplated. The process can be a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there should be a substantially homogeneous monomer distribution. At the same time, the polymerization is accomplished in substantially single step or stage or in a single reactor, as contrasted to multistage or multiple reactors (two or more). Multiple reactors where each of the above of reactors is of this description is also contemplated as a less preferred process of making the polymers.

Making polymer from the polymerization catalysts of this description can comprise the following steps: a) feeding solvent and a set of monomers in predetermined proportions to a polymerization reactor, b) adding a soluble metallocene catalyst to said reactor, c) polymerizing the set of monomers in solution to produce an effluent containing a polymer wherein the first and second set of monomers are chosen from the group propylene, ethylene, alph-olefin, non-conjugated diene. Polymers of this invention may be made by solution polymerization in a train of at least two continuous flow stirred tank reactors (CFSTR) connected in series with the addition of a metallocene catalyst. Each reactor should be capable of being fed independently with monomer and solvent. In order to remove polar compounds that act as catalyst poisons, all solvent and monomer feeds are desirably purified over mole sieves, alumina beds, or other absorbents as known in the art. Heat removal from the reactor is by methods well known in the art such as autorefrigeration, feed prechilling (adiabatic reactors), cooling coils, or various combinations of these techniques. Adiabatic reactors with prechilled feeds are preferred. Pressure should be sufficient to keep the reactor contents in solution at the reactor temperature. Polymerization may be carried out at temperatures in the range of −20° C. or lower to 200° C. or higher, and preferably, at 0° C. to 160° C. Most preferably polymerization is conducted in a range of 50° C. to 140° C. because the energy requirements for both recovering the polymer from solution and cooling the reactor during polymerization are reduced. The residence time per reactor is maintained at 1 to 180 minutes and preferably at 5 to 30 minutes. The polymer concentration in the effluent of the reactors is maintained in the range of 1 to 20% by weight and more preferably between 3 to 12% by weight. The overall polymerization rate is set by the catalyst and monomer feed rates. Polymer composition is controlled by adjusting the monomer feed rate to a reactor. Polymer molecular weight is set by choosing the reactor temperature, (MW decreases with temperature increases), monomer concentration (MW increases with increasing monomer concentration), and by optionally adding chain transfer agents such as hydrogen. The polymer product can be conventionally recovered from the effluent by coagulation with a nonsolvent such as isopropyl alcohol, acetone, or n-butyl alcohol, or the polymer can be recovered by stripping the solvent or other media with heat or steam. One or more conventional additives such as antioxidants can be incorporated in the polymer during, the recovery procedure. Possible antioxidants include phenyl-beta-naphthylamine, di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline.

Polymerization may be conducted by any of the polymerization procedures known in the art, however, it is highly preferred if not essential that the polymerization be conducted in a solution polymerization under conditions where both of the components are completely in solution. These polymerization conditions are obtained by the choice of a solvent, in sufficient quantity, common to both of the polymeric components as the polymerization medium at suitable reaction conditions, including temperature and pressure, such that all of the components of the polymer mixture are maintained in solution. Illustrative of solvents for making polymers of this invention are hydrocarbons such as aliphatics, cycloalphatics, and aromatic hydrocarbons. Preferred solvents are $C_{12}$ or lower straight-chain or branched-chain, saturated hydrocarbons, and $C_5$ to $C_9$ saturated alicyclic or aromatic hydrocarbons. Examples of such solvents or reaction media are hexane, butane, pentane, heptane, cyclopentane, cyclohexane, cycloheptane, methyl cyclopentane, methyl cyclohexane, isooctane, benzene, toluene, xylene, with hexane preferred.

Typically one or more transition metal compounds, one or more activators, and one or more monomers are contacted to produce polymer. The components may be contacted in a solution, bulk, gas or slurry polymerization process or a combination thereof, preferably solution phase or bulk phase polymerization process.

In general the transition metal compound and the activator should be combined in ratios of about 1:10,000 to about 1:1, in other embodiments the combined transition metal compounds and the activator are combined in ratios of 1:1 to 100:1. When alumoxane or aluminum alkyl activators are used, the combined pre-catalyst-to-activator molar ratio is from 1:5000 to 10:1, alternatively from 1:1000 to 10:1; alternatively, 1:500 to 2:1; or 1:300 to 1:1. When ionizing activators are used, the combined pre-catalyst-to-activator molar ratio is from 10:1 to 1:10; 5:1 to 1:5; 2:1 to 1:2; or 1.2:1 to 1:1. Multiple activators may be used, including using mixtures of alumoxanes or aluminum alkyls with ionizing activators.

One or more reactors in series or in parallel may be used. Catalyst component and activator may be delivered as a solution or slurry, either separately to the reactor, activated in-line just prior to the reactor, or preactivated and pumped as an activated solution or slurry to the reactor. A preferred operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

D. Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to about 110° C., and most preferably in the range of from about 70° C. to about 95° C. In another embodiment when high density polyethylene is desired then the reactor temperature is typically between 70 and 105° C.

The productivity of the catalyst or catalyst system in a gas phase system is influenced by the partial pressure of the main monomer. The preferred mole percent of the main monomer, ethylene or propylene, preferably ethylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

A reactor should be utilized that is capable of producing more than 500 lbs of polymer per hour (227 Kg/hr) to about 200,000 lbs/hr (90,900 Kg/hr) or higher, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr ( 45,500 Kg/hr).

Other contemplated gas phase processes include those described in U.S. Pat. Nos. 5,627,242, 5,665,818 and 5,677, 375, and European publications EP-A-0 794 200, EP-A-0 802 202 and EP-B-634 421 all of which are herein fully incorporated by reference.

Alternatively, the catalyst system may be in liquid form and introduced into the gas phase reactor into a resin particle lean zone. For information on how to introduce a liquid catalyst system into a fluidized bed polymerization into a particle lean zone, please see U.S. Pat. No. 5,693,727, which is incorporated by reference herein.

E. Slurry Phase Polymerization

A slurry polymerization process preferably is conducted between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process should be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of 3500 kPa to 6500 kPa and at a temperature in the range of about 60° C. to about 104° C. depending on the desired polymer melting characterisitcs. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of predominant monomer in the reactor liquid medium is in the range of from about 1 to 10 weight percent, preferably from about 2 to about 7 weight percent, more preferably from about 2.5 to about 6 weight percent, most preferably from about 3 to about 6 weight percent.

Another process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-isobutyl aluminum and an excess of alumoxane or modified alumoxane.

F. Homogeneous, Bulk or Solution Phase Polymerization

The catalysts described herein can be used advantageously in homogeneous solution processes. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10–30,000 MPa), in which the monomer acts as diluent or in solution polymerization using a solvent.

Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 0° C. and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1–16,000 MPa), most preferably from 1.0 to 500 bar (10–5000 MPa).

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling and the monomer feed my or may not be refrigerated. See the general disclosure of U.S. Pat. No. 5,001,205 for general process conditions. See also, international application WO 96/33227 and WO 97/22639.

G. Preferred Process for Making FPC

In the preferred embodiment, FPC is made using a single stage, steady state polymerization conducted in a well-mixed continuous feed polymerization reactor. In at least one embodiment, an FPC is prepared by a process which includes the following steps: (1) propylene is introduced in a stirred-tank reactor and dissolved in solvent; (2) the catalyst system is introduced in either the vapor or liquid phase; (3) optionally, comonomer (ethylene, and/or $C_4$–$C_{20}$ alpha-olefin, and/or polyene) is introduced in either the vapor or liquid phase. The reactor temperature and pressure may be controlled via autorefrigeration, refrigeration of the solvent, and/or cooling coils, jackets, etc. The polymerization rate is controlled by the concentration of catalyst and temperature. The comonomer content of the polymer product is controlled by manipulating the relative feed rates of these components to the reactor.

In at least one embodiment, an FPC is produced using a single sited polymerization catalyst, which allows only a single statistical mode of addition of the first and second monomer sequences, and is well-mixed in a continuous flow stirred tank polymerization reactor, which allows only a single polymerization environment for substantially all of the polymer chains of the polymer.

H. Polymerization Catalysts

In a broadest form, the compositions can be prepared using any SSC (single sited catalyst). Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

The ancillary ligand may be a structure capable of forming a π bond such a cyclopentadienyl type ring structure. The ancillary ligand may also be a pyridinyl or amide ligand. The transition metal is preferably of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The transition metal complex may impose a degree of steric order on the propylene monomer by suitable chirality. Where FPC's of higher molecular weight are desired or higher polymerization temperatures, it is preferable to a non- or weakly coordinated anion (the term non-coordinating anion as used herein includes weakly coordinated anions) as cocatalyst. Alternatively aluminoxanes or complexes incorporating oxy-aluminum moieties may be used.

A precursor for the non-coordinating anion may be used with a transition metal complex supplied in a reduced valency state. The precursor may undergo a redox reaction. The precursor may be neutral, such as a borane complex and form the transition metal cation by abstracting a ligand from it. The precursor may be an ion pair of which the precursor cation, such as a borate, is neutralized and/or eliminated in some manner. The precursor cation may be an ammonium salt as in EP-277003 and EP-277004. The precursor cation may be a triphenyl carbonium derivative as in EP426637. The non-coordinating anion can be a Group 10–14 complex wherein boron or aluminum is the charge bearing atom shielded by ligands which may be halogenated and especially perftiorinated. Preferably tetra-aryl-substituted Group 10–14 non-carbon element-based anion, especially those that are have fluorine groups substituted for hydrogen atoms on the aryl groups, or on alkyl substituents on those aryl groups.

The non-coordinating anion may be used in approximately equimolar amounts relative to the transition metal complexc, such as at least 0.25, preferably 0.5, and especially 0.8 and such as no more than 4, preferably 2 and especially 1.5.

The transition metal complex may be a pyridine amine complex useful for olefin polymerization such as those described in WO03/040201. The transition metal complex may a fluxional complex which undergoes periodic intra-molecular re-arrangement so as to provide the desired interruption of stereoregularity as in WAYMOUTH U.S. Pat. No. 6,559,262. The transition metal complex may be a stereorigid complex with mixed influence on propylene insertion, see Rieger EP1070087.

Preferably the transition metal complex is a chiral bridged bis cyvlopentadienyl derivative having the formula:

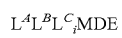

$L^A L^B L^C_i MDE$ where $L^A$ and $L^B$ are substituted or unsubstituted cyclopentadienyl or hetero-cyclopentadienyl ancillary ligand π-bonded to M in which the $L^A$ and $L^B$ ligands are covalently bridged together through a Group 14 element linking group; $L^C_i$ is an optional neutral, non-oxidizing ligand having a dative bond to M (i equals 0 to 3); M is a Group 4 or 5 transition metal; and, D and E are independently mono-anionic labile ligands, each having a σ-bond to M, optionally bridged to each other or $L^A$ or $L^B$. The mono-anionic ligands are displaceable by a suitable activator to permit insertion of a polymerizable monomer or macro-monomer can insert for coordination polymerization on the vacant coordination site of the transition metal component.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629, the disclosures of which are hereby incorporated herein by reference. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from −0° C. to 200° C. for a time of from 1 second to 10 hours.

In certain embodiments, the FPC of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce elastomeric polypropylene with an Mn of up to 4 million. See Sassmannshausen, Bochmann, Rosch, Lilge, *J. Organomet. Chem.* (1997) 548, 23–28.

Other possible single site catalysts are metallocenes which are bis cyclopentadienyl derivatives having a group transition metal, preferably hafnium or zirconium. Such metallocenes may be unbridged as in U.S. Pat. No. 4,522,982 or U.S. Pat. No. 5,747,621. The metallocene may be adapted for producing a polymer comprising predominantly propylene derived units as in U.S. Pat. No. 5,969,070 which uses an unbridged bis(2-phenyl indenyl)zirconium dichloride to produce a homogeneous polymer having a melting point of above 79° C. The cyclopentadienyl rings may be substituted and/or part of polycyclic systems as described in the above U.S. Patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950 which discloses bis(indenyl)bis (dimethylsilyl)zirconium dichloride and MAO; WO 98/27154 which discloses a dimethylsilyl bridged bisindenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non-or weakly coordinating anion activators (NCA) derived and generated in any of the ways amply described in published patent art such as EP277004, EP426637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638).

I. Second Polymer Component

Some embodiments of the invention include a second polymer component (SPC). Examples of SPC are propylene homopolymers, propylene copolymers, and mixtures thereof which are commonly known as reactor copolymers (RCPs) or impact copolymers (ICPs). Preferably, reactor copolymers and impact copolymers are contemplated to the extent that all of the components of the SPC are substantially similar in composition and the SPC has the crystallinity levels and melting point described below. In embodiments where the SPC includes a propylene copolymer, the propylene copolymer may be a graft copolymer, block copolymer, or random copolymer.

Preferably, the amount of propylene-derived units present in the SPC is 80 wt % or higher, or 85 wt % or higher, or 90 wt % or higher or 95 wt % or higher, or 97 wt % or higher, or 100 t %, based on the total weight of the SPC.

In at least one embodiment, the SPC includes a random copolymer of propylene and at least one comonomer selected from one or more of: ethylene and $C_4$–$C_{12}$ alpha-olefins. In a particular aspect of this embodiment, the amount of comonomer is within the range having an upper limit of 9 wt %, or 8 wt %, or 6 wt %, and a lower limit of 2 wt %.

The SPC of the invention preferably has a melting point by DSC of at least 110° C., or at least 115° C., or at least 130° C. The SPC of the invention preferably has a heat of fusion, as determined by DSC, of at least 60 J/g, or at least 70 J/g, or at least 80 J/g.

The SPC of the invention preferably has a weight average molecular weight ($M_w$) within the range having an upper limit of 5,000,000 g/mol, or 500,000 g/mol, and a lower limit of 10,000 g/mol, or 50,000 g/mol, and a molecular weight distribution $M_w/M_n$ (MWD), sometimes referred to as a "polydispersity index" (PDI), within the range having an upper limit of 40 and a lower limit of 1.5.

The SPC preferably has a melt flow rate (MFR) (determined by the ASTM D1238 technique, condition L) in the range of from 15 to 1500 dg/min, or at least 15, or al least 20 or at least 25 or at least 30 and/or less than 200 dg/min or less than 150 dg/min or less than 100 dg/min.

The SPC may be copolymer of propylene and one or more of the following olefins. Exemplary alpha-olefins for the rubber portion of the ICP, may be selected from one or more of ethylene; and $C_4$ to $C_{20}$ alpha olefins such as butene-1; pentene-1,2-methylpentene-1,3-methylbutene-1; hexene-1, 3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

J. Process for Making SPC

The invention is not limited by any particular method for preparing an SPC of the invention. In one embodiment, the SPC may be a propylene homopolymer obtained by a well known process for the homopolymerization of propylene in a single stage or multiple stage reactor. In another embodiment, the SPC may be a propylene copolymer obtained by a well known process for copolymerizing propylene and one or more comonomers in a single stage or multiple stage reactor.

Polymerization methods for preparing an SPC include high pressure, slurry, gas, bulk, solution phase, and combinations thereof. Catalyst systems that can be used include. traditional Ziegler-Natta catalysts and single-site metallocene catalyst systems. In one embodiment, the catalyst used has a high isospecificity.

Polymerization of an SPC may be carried out by a continuous or batch process and may include the use of chain transfer agents, scavengers, or other such additives well known to those skilled in the art. The SPC may also contain additives such as flow improvers, nucleators, and antioxidants which are normally added to isotactic polypropylene to improve or retain properties.

K. Third Polymer Component

Also included in each composition is a third polymer component (TPC). The TPC is a copolymer of ethylene, a $C_4$–$C_{20}$ α-olefin, and optionally a diene. In at least certain embodiments, the TPC is a "modifier component" as described herein. As the term is used herein, an ethylene α-olefin "polymer" or "copolymer" means a polymer that includes at least ethylene-derived units and α-olefin-derived units, but may also include units derived from one or more dienes. Preferred ethylene α-olefin "copolymers" are ethylene/butene, ethylene/hexene and ethylene/octene. A "terpolymer," on the other hand, specifically refers to a polymer that includes ethylene-derived units α-olefin-derived units and a third monomeric unit, typically a diene-derived unit. Examples of ethylene α-olefin "terpolymers" are ethylene/butene/diene, ethylene/hexene/diene and ethylene/octene/diene.

In at least certain embodiments, a TPC is a copolymer that consists of only ethylene and $C_4$+ α-olefin -derived units (e.g., no dienes) and in other embodiments a TPC is a copolymer that consists essentially of ethylene and $C_4$+ α-olefin-derived units, but may also include other monomeric units (including dienes) but those other monomeric units are present in an amount of no more than 1 wt % and preferably less.

In certain compositions described herein, a TPC (e.g., a modifier component) is a single polymer, preferably an elastomeric ethylene α-olefin polymer, in which the α-olefin is $C_4$+ (has four or more carbon atoms). These are described in greater detail elsewhere herein. In certain compositions described herein, a TPC (or modifier component) is a blend of two or more ethylene α-olefin polymers wherein at least one of the ethylene α-olefin polymers contains an α-olefin is an $C_4$+ (has four or more carbon atoms).

In both cases (single polymer and blend), the α-olefin of the ethylene α-olefin polymer may be a $C_4$+ α-olefin, including one of butene-1, 4-methyl-1-pentene, hexene-1, octene-1, decene-1, ondecene-1, dodecene-1 or combinations thereof. Preferably, the α-olefin or α-olefins present in said ethylene α-olefin polymer or polymers is <20 mole %, in each if two or more are present, and the modifier component is preferably substantially devoid of propylene crystallinity. Examples of TPCs, and their properties and molecular compositions, are set forth in the Examples below.

The amount of ethylene present in the TPC is preferably within the range having an upper limit of 95% or 90% or 85% or 80%, or 75%, or 70%, or 65%, or 60% by weight, and a lower limit of 35%, or 40%, or 45%, by weight, based on the total weight of the TPC. The amount of polyene present in the TPC can be within the range having an upper limit of 12%, or 10%, or 8%, or 6% by weight, and a lower limit of 0.1%, or 0.5%, or 1% by weight, based on the total weight of the TPC.

L. Blends

As noted above, in certain embodiments the TPC is (or includes) a blend. The blend may be comprised of one or more ethylene-alpha olefin copolymers and have an aggregate density above 0.900 g/cm$^3$, or in another embodiment $\geq$10 weight percent of the modifier component may be an ethylene alpha-olefin polymer having a density above 0.900 g/cm$^3$.

Alternatively, $\geq$10 percent by weight of the total weight of the modifier component is a copolymer with a density of $\geq$0.905 g/cm$^3$ or $\geq$0.910 g/cm$^3$ or $\geq$0.912 g/cm$^3$. This polymer may form $\geq$20, or $\geq$30, or $\geq$40, or $\geq$50, or $\geq$60, or $\geq$70, or $\geq$80, or $\geq$90 of the total of the modifier component on a weight percent basis. Or this copolymer may constitute substantially the whole of the modifier component. If two or more ethylene α-olefin polymers are combined to form the modifier component, they may be the same or different in their selection of comonomers and/or the amount of comonomer or comonomer amounts and/or densities.

The added polymer (one differing in density and or amount or type of comonomer from the copolymer described above) may be one generally used conventionally as modifier in TPOs, and as such may be generally lower in density than the first polymer described above. The amounts of such added or second polymer depend on the balance of effects desired. Generally a lower density polymer may enhance properties such as impact strength, while a higher density polymer, owing to its higher crystallinity, may enhance stiffness and tensile strength in the TPO compound. This additional polymer or polymers may be present in the modifier component at $\leq$80, or $\leq$70, or $\leq$60, or $\leq$50, or $\leq$40, or $\leq$30, or $\leq$20, or $\leq$10 weight percent. Such polymers of lower density include, but are not limited to polymers of having a density of $\leq$0.900, or $\leq$0.895, or $\leq$0.890, or $\leq$0.885, and/or $\geq$0.860, or $\geq$0.865 g/cm$^3$ A modifier component (either a single polymer or blends) may be present in the hetero phase polymer composition as a disperse phase, while the polypropylene component makes up the continuous phase. Thus, the amount of modifier component should not exceed that needed to maintain its dispersed condition in the polypropylene component continuous phase. When such an upper limit is reached, (the upper boundary of maintaining a dispersed condition) additional amounts of modifier component may tend to result in the modifier becoming a so-called "co-continuous phase" in which discrete, dispersed phase islands will coalesce into larger islands. This co-continuous state may be detrimental to physical properties, as the flexural modulus is lowered. To mitigate such effects, if larger amounts of modifier component are desired or required, a full or partial cross-linking can be effected. This full or partial cross-linking may decrease the tendency to co-continuity. Such cross-linking can be effected by chemical means (peroxide or sulfur or silane, azides, etc.) or by non-chemical means such as electron beam radiation.

The sizes of the individual domains of the dispersed phase are generally small, with the smallest length dimension for the dispersed phase being less than 10 μm. This phase size of the dispersed phase may be maintained during processing even without crosslinking. The disperse phase is comprised of a mixture of the modifier component with some amount of the polypropylene component, due to thermodynamic mixing of polymers. The balance of the polymers not in this disperse phase make up the continuous phase.

The one or more copolymers that make up the modifier component may be substantially free of propylene crystallinity, by which we intend <10 or <5 or <1 or 0 percent of propylene crystallinity is in the modifier component as determined by Differential Scanning Calorimetry (DSC).

M. Polypropylene Impact Copolymer (ICP)

In certain embodiments, the polypropylene component (SPC) is an impact copolymer. Such ICPs are themselves two phase systems, however, each of the two individual phases of the ICP may generally blend with the respective phase of the blend, i.e. crystalline and/or amorphous.

As indicated, an ICP can be in the polypropylene component as part or all of the PPC, used in combinations with the other components of the hetero phase composition. The ICPs have melt flow rates (MFR) of the polypropylene homopolymer portion of the ICP (determined by the ASTM D1238 technique, condition L) in the range of from 15 to 200, or at least 15 and/or less than 120 dg/min. Exemplary alpha-olefins for the rubber portion of the ICP, may be selected from one or more of ethylene; and $C_4$ to $C_{20}$ alpha olefins such as butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

Suitably if ethylene is the α-olefin in the rubber phase of the ICP, it may be present in the range of from 25–70 weight percent, or at least 30 and/or less than 65 percent based on the weight of the rubber phase. The rubber phase may be present in the ICP in the range of from 4–65 weight percent, or at least 6 or 10 weight percent and/or less than 18 weight percent, all based on the total weight of the ICP. The MFR of the ICP may be in the range of from 15 to 60, or may be at least 20 and/or less than 50 or less than 40 dg/min. The ICP may be so-called reactor blends.

An ICP may also be a physical blend of polypropylene and one or more elastomeric polymers of the ethylene α-olefin type, generally ethylene propylene elastomeric polymers.

An ICP useful in embodiments of our invention may be prepared by conventional polymerization techniques such as a two-step gas phase process using Ziegler-Natta catalysis. For example, see U.S. Pat. No. 4,379,759 which is fully incorporated by reference. The ICPs of embodiments of our invention are preferably produced in reactors operated in series, and the second polymerization, may be carried out in the gas phase. The first polymerization, may be a liquid slurry or solution polymerization process.

Metallocene catalyst systems may be used to produce the ICP compositions useful in embodiments of our invention. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (fully incorporated herein by reference) should be suitable.

A description of semi-crystalline polypropylene polymers and reactor copolymers can be found in "Polypropylene handbook", E. P. Moore Editor, Carl Hanser Verlag, 1996.

N. Specific Compositions

Certain compositions described above or elsewhere herein have a Notched Izod of about 2.5 ft-lb/in or more; or 3.0 ft-lb/in or more Certain compositions described above or elsewhere herein have a Melt Flow Rate of 20 g/10 min. or more; or 25 g/10 min. or more; or 35 g/10 min. or more.

Certain compositions described above or elsewhere herein have a Flexural Modulus of 100 kpsi or more; or 120 kpsi or more; or 130 kpsi or more.

In certain compositions described above or elsewhere herein, the polypropylene having a melting point of 110° C. or more is present in the composition in any one a number of different levels above 70 wt %, e.g., in the amount of 72 wt % or more; or 74 wt % or more; or 75 wt % or more; or 76 wt % or more; or 80 wt % or more; or 85 wt % or more.

In certain compositions described above or elsewhere herein, propylene polymer that is described above as having a heat of fusion less than 45 J/g, or a melting point less than 105° C., or both, e.g., having 60 wt % or more units derived from propylene, including isotactically arranged propylene derived sequences, is present in the composition in an amount of from a lower limit of 1.0, or 2, or 3, or 4, or 5 wt % to an upper limit of 15 wt %, or 10 wt %, or 5 wt %. In certain embodiments, that propylene polymer is present in an amount less than 5 wt %.

In certain compositions described above or elsewhere herein, an ethylene α-olefin polymer in which the α-olefin is $C_4$ or higher is present in the composition in an amount of form a lower limit of 10 wt % or higher, or 15 wt % or higher, or 20 wt % or higher, or 25 wt % or higher, to an upper limit of 30 wt % or less, or 25 wt % or less, or 20 wt % or less.

In certain compositions described above or elsewhere herein, the polypropylene having a melting point of 110° C. or more has a Melt Flow Rate of from a lower limit of 20, or 25, or 30, or 35, or 40 g/10 min to an upper limit of 50, or 60, or 70, or 80, or 90, or 100 g/10 min.

Certain compositions described above or elsewhere herein have a Melt Flow rate of from a lower limit of 20, or 25, or 30, or 35, or 40 g/10 min to an upper limit of 50, or 60, or 70, or 80, or 90, or 100 g/10 min.

In certain compositions described above or elsewhere herein, the polypropylene having a melting point less than 105° C. has a heat of fusion less than 40 J/g, or less than 35 J/g or less than 25 J/g., Certain compositions described above or elsewhere herein include one or more additives; or one or more additives selected from the group consisting of a lubricant, antistatic agent, slip agent, anti-block agent, colorant, metal deactivator, mole release agent, filler, reinforcement, fluorescent whitening agent and biostabilizer.

In certain compositions described above or elsewhere herein, the composition includes a pigment, which may in certain compositions be one or more colored pigments.

Examples of automotive articles that can be made from one or more of the compositions described above or elsewhere herein include exterior or interior car components. More specific embodiments of such automotive articles include bumper fascia, fender liners, wheel well covers, body side moldings, pillar trim, door trim panels, consoles, instrument panel end-caps, instrument panel trims, airbag covers, glove box bins, rear quarter panels, lift gate panels, seat back covers, airbag components, airbags, instrument panel covers, dash board skins, air dams and headliner cartridges.

In certain compositions described above or elsewhere herein, the polypropylene component is an impact copolymer (ICP) of propylene and an α-olefin, said ICP having one or more of a Tm>115° C., a Δ Hf>60 J/g, or a total α-olefin content of <70 weight percent; said α-olefin being one of ethylene, butene-1, 4 methyl-1-pentene, hexene-1, octene-1, decene-1, ondecene-1, dodecene-1 or combinations there of; and wherein said polypropylene component is one of isotactic, syndiotactic, atactic, or combinations thereof.

In certain compositions described above or elsewhere herein, the polypropylene component has one or more of a Tm>125° C., a Δ Hf of >80 J/g, or an α-olefin content of >2 wt. % or <50 wt. %, based on the total weight of said polypopylene component, and wherein said α-olefin being one or more of ethylene, butene-1, 4 methyl-1-pentene, hexene-1, octene-1.

In certain compositions described above or elsewhere herein, the polypropylene component has one or more of a Tm>130° C., a Δ Hf of >85 J/g; or an α-olefin content of >2 wt. % or <40 wt. %, based on the total weight of said polypropylene component, and wherein said α-olefin being one or more of ethylene, butene-1, hexene-1, octene-1.

In certain compositions described above or elsewhere herein, the polypropylene component has one or more of a Tm>135° C., a Δ Hf of >90 J/g; or an α-olefin content of >2 wt. % or <30 wt. %, based on the total weight of said, and wherein said α-olefin is ethylene.

In certain compositions described above or elsewhere herein, the polypropylene component is an ICP that has one or more of a Tm>140° C., a Δ Hf of >95 J/g; or an α-olefin content of >2 wt. % or <25 wt. %, based on the total weight of said polypropylene component, said ICP having a molecular weight in the range of from 10,000 to 5,000,000, said ICP having a melt flow rate (MFR), in the range of 15–60 g/10 min; said ICP including a homopolymer polypropylene and rubber, said rubber being present in said ICP in the range of 4–20 wt. %, based on the total weight of said ICP, said rubber having an α-olefin content of 25–70 weight %.

In certain compositions described above or elsewhere herein, the modifier component is a single polymer or a blend of two or more ethylene α-olefin polymers, said α-olefin being one of propylene, butene-1, 4-methyl-1-pentene, hexene-1, octene-1, decene-1, ondecene-1, dodecene-1 or combinations thereof, said α-olefin or α-olefins present in said ethylene α-olefin polymer or polymers <20 mole %, in each if two or more are present, said modifier component being substantially devoid of propylene crystallinity.

In certain compositions described above or elsewhere herein, the compatibilizer component and the polypropylene component have substantially the same stereoregularity, chosen from one of isotactic, syndiotactic, atactic, or combinations there of; said compatibilizer component being a propylene α-olefin polymer having one or more α-olefin comonomers present in said compatibilizer component, said α-olefins selected from one or more of ethylene or an α-olefin having 4–12 carbon atoms.

In certain compositions described above or elsewhere herein, the compatibilizer component has a crystallizable portion and an amorphous portion, said amorphous portion being the result of one of stereo error introduced by a catalyst or by the amount and nature of a comonomer.

In certain compositions described above or elsewhere herein, the compatibilizer component is a polymer of propylene and one or more of ethylene, butene-1, 4-methyl-1-pentene, hexene-1, octene-1, and decene-1.

In certain compositions described above or elsewhere herein, the compatibilizer component is a polymer of propylene and one or more of ethylene, butene-1, hexene-1, or octene-1; wherein said compatibilizer component has a crystallinity defined by a melting point (Tm)<105° C., and/or a Δ Hf<35 J/g, and/or a Mooney viscosity ML (1+4)@125° C.<100, said compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component; wherein said polypropylene component is present in said hetero phase polymer composition in the range of from 70–90 wt. %; said modifier component is present in said hetero phase polymer composition in the range of from 10–25 wt. %; and said compatibilizer component being present in said hetero phase polymer composition in the range of from 0.1–8 wt. %; said weight percents of a), b) and c), being based on the total polymer weight of said hetero phase polymer composition.

In certain compositions described above or elsewhere herein, the compatibilizer component has a crystallinity defined by a melting point (Tm)<100° C., and/or a Δ Hf<25 J/g, and/or a Mooney viscosity ML (1+4)@125° C.<75; wherein said polypropylene component is present in said hetero phase polymer composition in the range of from 80–90 wt. %; said modifier component is present in said hetero phase polymer composition in the range of from 15–22 wt. %; and said compatibilizer component-being present in said hetero phase polymer composition in the range of from 0.1–5 wt. %; said weight percents of a), b) and c), being based on the total polymer weight of said hetero phase polymer composition.

In certain compositions described above or elsewhere herein, the modifier component is present in said blend at ≦9.5 weight percent, and a melt inden in the range of from 0.1–10 g/10 minutes, 190° C., said modifier component being an ethylene α-olefin polymer including ethylene and an α-olefin selected from an α-olefin having 3–12 carbon atoms.

In certain compositions described above or elsewhere herein, the modifier component is present in said blend at ≦9.0 weight percent, and wherein said α-olefin is selected from one or more of propylene, butene-1, 4-methyl-1-pentene, hexene-1, octene-1, decene-1, ondecene-1, dodecene-1 or combinations thereof.

In certain compositions described above or elsewhere herein, the α-olefin is selected from one or more of butene-1, hexene-1, or octene-1, said α-olefin being present in said ethylene α-olefin polymer at <20 mole percent.

In certain compositions described above or elsewhere herein, the modifier component is a blend of two or more ethylene α-olefin polymers, with the proviso that if more than one polymer makes up the modifier component, α-olefin selected and amount contained may be the same or different in each, as well as the same or different densities.

In certain compositions described above or elsewhere herein, the polypropylene component has a Tm>110° C. or a Δ Hf>60 J/g, and a polydispersity index (PDI) in the range of from 1–40, and wherein said modifier component is substantially free of propylene crystallinity.

In certain compositions described above or elsewhere herein, the polypropylene component is an impact copolymer (ICP) of propylene and an α-olefin, said ICP having one or more of a Tm>115° C., a Δ Hf>70 J/g, or a total α-olefin content of <70 weight percent; said α-olefin being one of ethylene, butene-1, 4 methyl-1-pentene, hexene-1, octene-1, decene-1, ondecene-1, dodecene-1 or combinations there of; and wherein said polypropylene component is one of isotactic, syndiotactic, atactic, or combinations thereof.

In certain compositions described above or elsewhere herein, the polypropylene component has one or more of a Tm>125° C., a Δ Hf of >80 J/g, or an α-olefin content of >2 wt. % or <50 wt. %, based on the total weight of said polypropylene component, and wherein said α-olefin being one or more of ethylene, butene-1, 4 methyl-1-pentene, hexene-1, octene-1.

In certain compositions described above or elsewhere herein, the polypropylene component has one or more of a Tm>130° C., a Δ Hf of >85 J/g; or an α-olefin content of >2 wt. % or <40 wt. %, based on the total weight of said polypropylene component; and wherein said α-olefin being one or more of ethylene, butene-1, hexene-1, octene-1.

In certain compositions described above or elsewhere herein, the polypropylene component has one or more of a Tm>135° C., a Δ Hf of >90 J/g; or an α-olefin content of >2 wt. % or <30 wt. %, based on the total weight of said, and wherein said α-olefin is ethylene.

In certain compositions described above or elsewhere herein, the polypropylene component has one or more of a Tm>140° C., a Δ Hf of >95 J/g; or an α-olefin content of >2 wt. % or <25 wt. %, based on the total weight of said polypropylene component, said polypropylene component having a molecular weight in the range of from 10,000 to 5,000,000, said polypropylene component having a melt flow rate (MFR), in the range of from 15–60 g/10 min; said ICP including a homopolymer polypropylene and rubber, said rubber being present in said ICP in the range of from 4–20 wt. %, based on the total weight of said ICP, said rubber having an α-olefin content of 25–70 weight %, said ICP having a PDI in the range of from 1–40.

In certain compositions described above or elsewhere herein, the compatibilizer component and said polypropylene component have substantially the same stereoregularity, chosen from one of isotactic, syndiotactic, atactic, or combinations thereof; said compatibilizer component being a propylene polymer having one or more α-olefin comonomers present in said compatibilizer component, said α-olefins selected from one or more of ethylene or an α-olefin having 4–12 carbon atoms.

In certain compositions described above or elsewhere herein, the compatibilizer component has a crystallizable portion and an amorphous portion, said amorphous portion being the result of one of stereo error introduced by a catalyst or by the amount and nature of a comonomer.

In certain compositions described above or elsewhere herein, the compatibilizer component is a polymer of propylene and one or more of ethylene, butene-1, 4-methyl-1-pentene, hexene-1, octene-1, and decene-1.

In certain compositions described above or elsewhere herein, the compatibilizer component is a polymer of propylene and one or more of ethylene, butene-1, hexene-1, or octene-1; wherein said compatibilizer component has a crystallinity defined by a melting point (Tm)<105° C., and/or a Δ Hf<35 J/g, and/or a Mooney viscosity ML (1+4)@125° C.<100, said compatibilizer component has a narrow compositional distribution, such that >75 wt. % of the compatibilizer component may be isolated in a thermal fractionation, in 2 adjacent soluble fractions, where each fraction differs <20% from the average weight present α-olefin of the total compatibilizer component; wherein said polypropylene component is present in said hetero phase polymer composition in the range of from 70–90 wt. %; said modifier component is present in said hetero phase polymer composition in the range of from 15–25 wt. %; and said compatibilizer component being present in said hetero phase polymer composition in the range of from 0.1–8 wt. %; said weight percents of a), b) and c), being based on the total polymer weight of said hetero phase polymer composition.

In certain compositions described above or elsewhere herein, the compatibilizer component has a crystallinity defined by a melting point (Tm)<100° C., and a Δ Hf<25 J/g, a Mooney viscosity ML (1+4)@125° C.<75; wherein said polypropylene component is present in said hetero phase polymer composition in the range of from 80–90 wt. %; said modifier component is present in said hetero phase polymer composition in the range of from 15–20 wt. %; and said compatibilizer component being present in said hetero phase polymer composition in the range of from 0.1–5 wt. %; said weight percents of a), b) and c), being based on the total polymer weight of said hetero phase polymer composition.

NI Ratio and FM Ratio

Certain blends disclosed herein show unusual and unexpected improvement in the impact strength as measured by the Notched Izod @ 21° C. in relation to the changes in the Flexural modulus as measured by the 1% secant. Such improvements can be explained in various ways, e.g., in terms of two parameters: NI ratio and FM ratio.

The NI ratio is the ratio of two notched Izod impact strength measured at the above temperature. The numerator in this ratio is the impact strength of the blend containing an FPC. The denominator in the ratio is a comparative blend that does not contain FPC. The two blends which are compared contain the same proportion, within +/−1 wt %, of the same SPC and the same TPC although the TPC is present in slightly different proportions between the two blends because of the presence of the FPC in one blend and the absence of the FPC in the other blend. Typically, the maximum amount of FPC is about 5 wt %, thus in the two blends the amount of the TPC can differ by up to this amount. This NI ratio reflects the efficacy of FPC in raising the Notched Izod impact strength of the blend when present in small quantities.

The FM ratio is the ratio of two Flexural modulus measured as the 1% secant at the above temperature. The numerator in the ratio is a flexural modulus of a comparative blend that does not contain FPC. The denominator in the ratio is the flexural modulus of the blend containing the FPC. The two blends which are compared contain the same proportion, within +/−1 wt %, of the same SPC and the same TPC though the TPC is present in slightly different proportions between the two blends because of the presence of the FPC in one blend and the absence of the FPC in the other blend. Typically, the maximum amount of FPC is about 5 wt %, thus in the two blends the amount of the TPC can differ by up to this amount. This FM ratio reflects the efficacy of the FPC in lowering the flexural modulus of the blend when present in small quantities.

Particularly desirable are blends where the addition of the FPC raises the NI ratio without significant effect on the FM ratio. A preferred composition includes blends where the NI ratio is greater than the FM ratio. More preferable, are blends where the NI ratio is 2 fold, 3 fold, 5 fold or 7 fold the FM ratio.

The values of the NI ratio and the FM ratio for the examples are described in Table 18.

F2 Parameter

A preferred composition is one that includes an ethylene α-olefin elastomer in which the α-olefin is $C_4+$ (has four or more carbons on the chain) and has unexpectedly superior properties, particularly properties desirable for making articles such as (but not limited to) automotive parts. At least one of the superior properties is the impact strength as measured by the Notched Izod at 21° C. (21.5+/−1.5° C.) that takes overall molecular composition into account. Certain compositions are disclosed herein that can be quantitatively characterized in terms of parameter F2, defined by the following formula:

$$F2=(\text{Notched Izod})\times(\text{wt \% } C_2-8.5)^2/[(\text{wt \% EE}-18)^{3.5}] \quad \text{Equation 1}$$

Qualitatively speaking the parameter F2 reflects superior impact strength properties. More particularly, a high F2 value reflects a high Notched Izod level that does not unduly sacrifice other important properties. The F2 parameter reflects how certain compositions herein possess surprisingly improved Notched Izod impact strengths in spite of having lower amounts of elastomer or an elastomer with a very high ethylene content. In other compositions, the use of lower amounts of elastomer or elastomers with very high ethylene content can tend to lead to poor Notched Izod impact strength. It is highly desirable that the Notched Izod of a composition be improved without loss of softening temperature or the loss of stiffness for the TPO composition.

Surprisingly, certain compositions defined by certain claims, e.g., those that include an ethylene α-olefin elastomer in which the α-olefin is $C_4+$, display a higher F2 than other compositions, e.g., those in which the ethylene α-olefin elastomer is ethylene-propylene. Particularly desirable are compositions that include a certain amount of FPC (e.g., from 1 to 10 wt % FPC), as well as SPC and TPC, in which the F2 of the composition is higher than a composition identical except for the replacement of a certain amount of SPC or TPC with FPC.

The F2 value of a composition, e.g., a TPO composition, may be determined by analyzing the composition, in particular by measuring three values, and then combining those values into the Equation 1. In essence, F2 is a calculated number that is derived (based on) three measured numbers. The three measured numbers (values) are Notched Izod, wt % $C_2$ and wt % EE.

The Notched Izod number in the above equation is the measured Notched Izod strength of the specimen at a temperature of 21° C., expressed in units of ft-lbs/in. As noted elsewhere herein, Notched Izod is measured in accordance with ASTM D256.

The wt % $C_2$ is the wt % (percent by weight) of ethylene derived residues (units) in the composition. For purposes of measuring the F2 of a composition (to determine whether the claims are met), any published analytical method or technique for measuring or deriving wt % $C_2$ (ethylene content) of a composition may be used, e.g., NMR or IR spectroscopy. A preferred method for measuring $C_2$ content is to measure the $C_2$ content of the entire composition (analytically, as a whole). An alternative, which is to some extent an approximation, is to arrive at the arithmetic sum of the percentage weighted ethylene contents of the various polymer components, e.g., the FPC, SPC and TPC. When the arithmetic sum approach is used, it is helpful to note that the weight of ethylene in an SPC that is iPP is zero but when the SPC is an impact copolymer or random copolymer the weight of the contained ethylene residues must be accounted for. In the arithmetic approach, each of the polymer components (e.g., FPC, SPC and TPC) may have their own different levels of ethylene-derived residues; however, the wt % $C_2$ is the total amount of ethylene in the composition.

The wt % EE is the wt % (percent by weight) of elastomer in the composition. However, any amount of propylene polymer having a heat of fusion less than 45 J/g with 60 wt % or more propylene, units in the composition, e.g., any polymer defined as an "FPC" herein, is not included in obtaining the wt % EE. Therefore, when a composition includes FPC, SPC and TPC, only the SCP and TPC are used to arrive at the wt % EE. In the case of blends in which the SPC is iPP (e.g., SPC 1, 2, 3 and 4 in the examples), the wt % EE is the wt % of TPC in the blend. In the case of blends where the SPC is a random copolymer (RCP) or impact copolymer (ICP) (e.g., SPC 6, 7 or 8) the wt % EE is the arithmetic sum of two components. The first component in the sum is the wt % of TPC in the blend. The second component is two times the wt % ethylene content of the RCP and/or ICP, multiplied by the weight fraction of the amount of the ICP or RCP in the blend. The rationale of this calculation is that the ethylene contained in the RPC and ICP are deemed to exist as an elastomer that contains 50 wt % ethylene and 50 wt % propylene. Thus, for example, the wt % EE for a blend composed of F wt % FPC, S wt % SPC and T wt % TPC, where the SPC contained c wt % ethylene, the wt % EE used in the calculation of the F2 parameter would be calculated as follows: Wt % EE=T+2*c*(S/100). When the SPC is an iPP homopolymer (no ethylene content), such that c=0, the Wt % EE=T. When the SPC is an ICP or RCP, the c>0, so that Wt % EE=T+2*c*(S/100).

Surprisingly, certain compositions defined by certain claims, e.g., those that include an ethylene α-olefin elastomer in which the α-olefin is $C_4+$, display a higher F2 than other compositions, e.g., similar composition in which the ethylene α-olefin elastomer is ethylene-propylene. Particularly desirable are compositions tat include a certain amount of FPC (e.g., from 1 to 10 wt % FPC), as well as SPC and TPC, in which the F2 of the composition is higher than a composition identical except for the replacement of a certain amount of SPC or TPC with FPC.

The F2 parameter is a measure of the Notched Izod impact strength of the blend which accounts for differences in the amount and the composition of the elastomer. The presence of a large amounts of the elastomer or of an elastomer which is truly amorphous (by virtue of having a low ethylene content by weight) leads to undesirable loss of the stiffness of the blend. Thus, preferred compositions are blends having a high Notched Izod impact strength with only relatively small amounts of elastomer or elastomer that is semicrystalline by virtue of having a high ethylene content.

In addition, the Notched Izod impact strength (and preferably also the F2 parameter) of blends herein bears a relationship to the viscosity (and/or the MFR) of the blend. Many blends with low MFR values tend to have intrinsically high Notched Izod impact strength due to the presence of a high molecular weight component, which corresponds to the high viscosity. By contrast, many blends with high MFR values do not have sufficiently high Notched Izod impact strength. Thus, preferred compositions herein are blends having a high Notched Izod impact strength in spite of having a relatively high MFR, as reflected by a high F2 parameter.

Certain preferred blends have an F2 parameter that is expressed by the following inequality:

$$F2>3.6736(\text{MFR}@230\ C)^{1.2229} \quad \text{Equation 2}$$

A preferred composition is one of the blends described herein in which the F2 parameter satisfies the inequality in Equation 2. Other preferred compositions satisfy the inequality by 0.01, or 0.02, or 0.05, or 0.1, or 0.2, or 0.5, or 0.7 or 1.0 or 2.0 or 3.0. Further disclosed herein are compositions having different MFR levels (e.g., 30, 35, 40, 45, 50, 55, 60, 65, or more), in which Equation 2 is applied to those MFR levels, and the results of Equation 2 is hereby incorporated by reference.

Automotive Articles, Compositions and Improved Properties

Preferred compositions herein are particularly useful for automotive applications, preferably for making molded high impact automotive parts such as car bumpers, e.g., bumper fascia. These compositions are blends, preferably physical blends, which have high impact and improved ductility.

It has been observed that certain compositions described above and elsewhere herein have a surprisingly improved set of mechanical properties, e.g., compositions that contain high levels of isotactic polypropylene, e.g., above 70 wt %. Generally speaking, one of the problems with adding more isotactic polypropylene to any thermoplastic composition is a noticeable drop in ductility. For example, any improvement in a mechanical or impact property such as Notched Izod tends to be accompanied by an undesirably high loss of flexibility, e.g., Flexural Modulus. Such a trade-off is of great concern for the makers of automotive parts, particular car bumpers. The composition described above provides a surprising balance of (a) high Notched Izod together with (b) high Flexural Modulus. The particular balance of those properties is different and unexpectedly superior to the properties found in other car bumper compositions. In addition to having superior mechanical properties, the compositions also have desirable molding properties, e.g., sufficiently high Melt Flow Rate, without losing their superior impact strength and flexibility.

A particular improvement in both Notched Izod and Flexural Modulus is seen for compositions above and described elsewhere herein when compared to a composition having either (a) a different type of ethylene alpha-olefin elastomer, e.g., an ethylene-propylene elastomer or (b) a different thermoplastic component that is different from the propylene polymer above. As demonstrated in the examples below, compositions containing more than 70 wt % polypropylene achieve less satisfactory levels of Notched Izod and Flexural Modulus when they include an ethylene-propylene elastomer (as opposed to $C_4+$ elastomers).

Also demonstrated by examples is that compositions with less than 10 wt % (or less than 5 wt %) of the random propylene copolymer described above fail to achieve satisfactory levels of Notched Izod and Flexural Modulus when they include an ethylene-propylene elastomer (as opposed to the $C_4+$ elastomers of this invention).

European Claims:

For the purpose of legal systems in which preferred or optional features can be linked or be dependent on multiple other features in the claims (such as under the European Patent Convention) we provide the following summary of interpendence.

One underlying inventive concept is:

A1. A composition comprising:
polypropylene having a melting point of 110° C. or more for forming a continuous phase;
a random ethylene α-olefin polymer as an impact modifier in which the α-olefin is $C_4$ or higher; and
propylene polymer compatibilizer, having 60 wt % or more units derived from propylene, including isotactically arranged propylene derived sequences and further having a heat of fusion less than 45 J/g.

This concept may be used together with one or more of the options set out below:

A2. The composition may have:
a Notched Izod @ 21° C. of 2.5 or more; and
F2 greater than $3.6736(MFR@230 C)^{-1.2229}$ wherein F2 is defined as $(Notched\ Izod) \times (wt\ \%\ C_2-8.5)^2/[(wt\ \%\ EE-18)^{3.5}]$.

A3. All the above compositions may contains polypropylene in an amount greater than 70 wt % and preferably greater than 75 wt %; a Melt Flow Rate of about 20 g/10 min. or more and preferably less than 100 g/min; a Notched Izod of about 2.5 ft-lb/in or more; and/or a Flexural Modulus of about 100 kpsi or more. More preferably the above compositions may have a Melt Flow Rate of from about 40 to 80 g/10 min.

A4. The propylene polymer compatibilizer referred to above may have a melting point less than 105° C.; a Melt Flow Rate of about 20 g/10 min. or more, measured according to ASTM-1238 @ 230° C. using 2.16 kg; a Notched Izod of about 2.5 ft-lb/in or more; and/or a Flexural Modulus of about 100 kpsi or more.

A5. The modifier component referred to above may be a dispersed phase and comprise at least 50 percent by weight of the total modifier component of an ethylene α-olefin polymer in which the α-olefin is $C_4$ or higher and in which the density is less than 0.9 g/ml.

A6. The compatibilizer may be present in any of the possible combination in the composition in an amount of from about 1 to about 15 wt %. The impact modifier may be similarly present in any of the above compositions in an amount of from about 10 to about 30 wt %.

Any or all of the compositions having any or all of the above features may comprise one or more additives selected from the group consisting of a lubricant, antistatic agent, slip agent, anti-block agent, colorant, metal deactivator, mold release agent, filler, reinforcement, fluorescent whitening agent and biostabilizer and/or a pigment, preferably a colored pigment.

A7. The above compositions may forms part of an exterior car component such as a bumper fascia.

EXAMPLES

A. Introduction

Various composition samples were prepared, as reflected in the following examples, to demonstrate aspects of the inventions defined by one or more claims, and also to demonstrate comparative aspects of subject matter falling outside of some or all of the claims. Assessing whether "comparative" examples fall inside or outside the scope of the claims requires a comparison to the claim in question.

B. Blending and Specimen Preparation

The samples were blended (compounded) in a 30 mm ZSK® twin-screw extruder, with 0.2 parts per hundred of the polymer of Irganox 1010 added to all mixtures. Compounding in the twin screw extruder was accomplished using an intense mixing screw element. Typical polypropylene extrusion conditions were used, with extruder melt temperature set at 210° C. and screw-speed setting between 160–180 rpm. The batch size was 5000 gm. The temperature profile in the various extruder zones was ramped progressively from 170° C. to 210° C. Actual extruder zone temperatures during compounding were as follows: Zone 1=177° C.; Zone 2=182° C.; Zone 3=188° C.; Zone 4=193°

C.; and Die Temperature=204° C. The compounds discharged from the extruder were then palletized and injection molded into test specimens.

Standard test specimens conforming to ASTM specifications were prepared by injection molding on a 300-ton Van Dom press. The nozzle, front and rear temperatures of the injection molding equipment were maintained at 190° C. The mold temperature was kept constant at 27° C. The total cycle time was 54 seconds and the injection pressure was 4 MPa. A family mold containing various ASTM specimen cavities was used.

C. Physical Property Measurements

Certain characteristics and properties of the specimens were measured (tested). The test/measurement procedures and conditions are set forth in TABLE 1, supplemented by the discussion below.

TABLE 1

| TEST | METHOD |
| --- | --- |
| Notched Izod Impact (ft-lb./inch) | ASTM D 256 |
| 1% Secant Modulus (MPa) psi | ASTM D 790 A |
| Tangent Modulus (MPa) psi | |
| Tensile Strength @ yield (MPa) psi | ASTM D 638 |
| Young's Modulus (MPa) psi | |
| Elongation @ yield/brk. (%) | |
| Melt Flow Rate (gm/10 min) | ASTM D 1238, Condition L (230° C.) |
| Melt Index (g/10 min) | ASTM D 1238, Condition E (190° C.) |
| Gardner Impact @ −29° C. (dN · m) | ASTM D 5420 Geometry GC |
| Rockwell Hardness | ASTM D 785 |
| Heat Distortion Temperature (HDT) @ (.45 MPa load) | ASTM D 648 |
| Instrumented Impact | ExxonMobil Method (below) |
| Crystalline Melting Point (abbreviated Tm) | Differential Scanning Calorimetry (DSC). Heating and cooling rates were 10° C./minute. Tm is the temperature at which a maximum occurs in the heat absorption curve. |
| Glass Transition temperature (Tg) | DSC, ASTM E-1356, at a heating rate of 5° C./minute) |
| Density g/cm$^3$ | ASTM D-792 |

Notched and Izod Impact Strength:

The Notched Izod values were measured according to ASTM D256 at 21° C., more particularly at 21.5° C. (+/−1.5° C.), using equipment made by Empire Technologies Inc.

Flexural Modulus:

The flexural modulus values were obtained according to ASTM D790A, with a crosshead speed of 1.27 mm/min (0.05 in/min), and a support span of 50.8 mm, using an Instron machine.

Tensile Strength at Yield and Elongation at Yield:

Tensile strength at yield was measured according to ASTM D638, with a crosshead speed of 50.8 mm/min, and a gauge length of 50.8 mm, using an Instron machine. The elongation at yield was also measured according to ASTM D638.

Instrumented Impact:

ExxonMobil Test method is described in T. C. Yu "Impact Modification of Polypropylenes with Exact Plastomers", Soc. of Plastics Engineers, ANTEC, May 1994. Multi-axial tests were performed at −30° C. and −40° C. using a Dynatup® instrumented impact tester fitted with an environmental chamber and cooled using liquid nitrogen. The specimens were conditioned for 24 hours at either −30° C. or −40° C. prior to testing. This test consists of puncturing a cylindrical test specimen (152 mm diameter, 3.2 mm thickness) with a falling weight fitted with a 20.3 mm hemispherical striker. Both the weight of the striker and the velocity with which it strikes the specimen can be adjusted. The striker normally loses about 10% of its impact velocity while passing through the sample. A minimum of 5 samples was tested for each condition.

For this test method, high-speed puncture testing based on ASTM D-3763 was used to study impact behavior. This test continuously measures the applied force and time during the impact event. The electronically collected data points are next processed through a computer to provide graphic representation of both force and energy as a function of displacement.

A drop-weight tester, Ceast Fractovis, was used to gather the data. It consists of three main parts: clamp assembly, plunger assembly, and IBM PC based control unit. Two parallel rigid plates with a large opening to expose the test specimen form the clamp assembly. Both the top and bottom plates are of the same dimension. The plunger assembly consists of a steel rod with a removable hemispherical tip to hold the measuring strain gauge. It is located perpendicular to and centered on the clamp hole. A control unit regulates the plunger test speed, as well as records the load and displacement data. Similar to the conventional notched Izod testing, the test geometries need to be carefully defined because they are not precisely specified in the ASTM procedure. A 20 mm diameter hemispherical striker and a 40 mm opening clamp were used for this study. The test speed was set at 4 m/sec. For sub-ambient temperature testing, test specimens were chilled in a freezer for four hours at the test temperature. They were then stored in a liquid nitrogen cooled test chamber underneath the clamp assembly for further conditioning before testing.

A force-displacement graph may be generated for a ductile material. Integration of the force displacement curve, in turn, yields an energy-displacement curve. This energy is reported in the Tables below. Initially, a ductile material may behave as elastic solid in that deformation is proportional to the displacement. The initial slope of the generated graph is therefore a measure of the sample stiffness. After the elastic region, the sample starts to yield to the advancing plunger. At the yield point, the sample exerts its maximum resistance, the yield point is therefore the highest point on the force-displacement curve. Afterwards, the high speed plunger initiates a crack in the sample and starts its downward penetration of the test specimen. The sample then starts to draw to accommodate the advancing plunger. Finally the plunger punctures through the test specimen; and, lastly, a small amount of energy is needed to overcome the friction between the test plunger and the plastic sample. Because of the large extent of this sample drawing, the total energy is approximately twice the yield energy. A ductility index (DI) can be defined as: DI=[(Total Energy−Yield Energy)/Yield Energy]×100.

D. Polymers

The "FPC" referenced in certain Examples was a propylene ethylene copolymer with an ethylene content of 16 wt %, Mooney Viscosity of 22 and MFR of 2.8 g/10 min. For a description of how the FPC was prepared, see Example 1.

The SPC polypropylene resins used in the Examples were isotactic polypropylene polymers, including impact copolymers, random copolymers and homoisocatic polymers. All resins listed in Table 2 are commercially available under the trade name Escorene®PP grades from ExxonMobil Chemical, Houston, Tex., with the exception of the resin called "70 MF R PP," which is an experimental resin.

The 70 MFR HPP is a homopolymer made by bulk polymerization of propylene with Ziegler-Natta catalyst system supplied by Toho Tinaium Company under the trade name THC-C-135 and at a donor level of 37 ppm donor (a blend of propyltriethoxy silane and dicyclopentyldimethoxy silane, 95/5 mol %), 5000 ppm of H2, temperature of 70 C. The met flow rate (MFR) of the polymer is about 70 g/10 min. The xylene solubles (as measured by dissolving completely the polymer at 145–150 C. in xylene, allowing the solution to cool to the temperature and measuring the polymer in the filtrate after evaporation of the solvent) in the polymer is about 2 wt %. The molecular weight distribution (MWD) or polydispersity index (PDI) as measured by gel permeation chromatography (GPC) in tricholro benzene is about 4.5. The flexural modulus as measured on the homopolymer pellets nucleated with sodium benzoate at 0.1 wt % and stabilized with antioxiants and injection molded samples is about 270–275 kpsi (1860 to 1900 MPa).

TABLE 2

SPC polymers used in examples

| | Melt Flow Rate @ 230° gm/10 min | Density gm/cc | Comonomer Type | Comonomer Content Wt. % | Type |
|---|---|---|---|---|---|
| PP 7805 | 80 | 0.9 | Ethylene | 3.5 | ICP |
| PP 1105E1 | 35 | 0.9 | None | 0 | Homo PP |
| PP 1074 | 20 | 0.9 | None | 0 | Homo PP |
| PP 1024 | 12 | 0.9 | None | 0 | Home pp |
| 70 MF R PP | 70 | 0.9 | None | 0 | Homo PP |
| PP 2252 | 5 | 0.9 | None | 0 | Homo PP |
| PP 7715 | 35 | | Ethylene | 8.88 | ICP |
| PP 7414 | 20 | | Ethylene | 9.8 | ICP |

The ethylene/α-olefin elastomers used in the Examples are listed in Table 3A, 3B and 3C. The TPC polymers in Table 3A are commercially available under the trade name Exceed® (abbreviated as ECD) or Exact® from ExxonMobil Chemical. The TPC polymers in Table 3B are commercially available under the trade name Engage® (abbreviated as EN) from DuPont Dow Elastomers. The TPC polymers in Table 3C are experimental polymers. A comparative ethylene copolymer, containing propylene as the comonomer, is Vistalon 706 containing containing 65% ethylene and having a 42 ML(1+4)@125 C. This polymer is available from the ExxonMobil Chemical Co, Houston, Tex.

TABLE 3A

TPC polymers from ExxonMobil Chemical

| | Melt Index @ 190° C. gm/10 min | Mooney ML(1 + 4)@ 125 C. | Density gm/cc | Comonomer Type | Comonomer Content Wt. % |
|---|---|---|---|---|---|
| ECD 411 | 3.5 | | 0.912 | $C_6$ | 9.5 |
| ECD 330 | 12.5 | | | $C_6$ | 9.5 |
| Exact 4033 | 0.8 | 27 | 0.880 | $C_4$ | 18.1 |
| Exact 8201 | 1.1 | 17 | 0.882 | $C_8$ | 29.3 |
| Exact 4150 | 3.5 | 8 | 0.895 | $C_6$ | 18.4 |
| Exact 8203 | 3.0 | 11 | 0.895 | $C_8$ | 29.3 |
| Exact 4041 | 3.0 | 10 | 0.878 | $C_4$ | 20.3 |
| Exact 5061 | 0.5 | 35 | 0.868 | $C_8$ | 37.5 |
| Exact 5101 | 1.1 | 17 | 0.902 | $C_8$ | 18.3 |
| Exact 5171 | 1.0 | 23 | 0.870 | $C_8$ | 36.3 |
| ECD 321 | 22 | | 0.912 | $C_6$ | 9.5 |

TABLE 3B

| | Melt Index @ 190° C. gm/10 min | Mooney ML(1 + 4)@ 125 C. | Density gm/cc | Comonomer Type | Comonomer Content Wt. % |
|---|---|---|---|---|---|
| EN 8180 | 0.5 | 35 | 0.863 | $C_8$ | 42 |
| EN 8842 | 1.0 | 26 | 0.857 | $C_8$ | 45 |

TABLE 3C

| | Melt Index @ 190° C. gm/10 min | Mooney ML(1 + 4)@ 125 C. | Density gm/cc | Comonomer Type | Comonomer Content Wt. % |
|---|---|---|---|---|---|
| P1 | 0.5 | 31 | 0.860 | $C_8$ | 42 |
| P3 | 1.0 | | 0.870 | $C_8$ | 36 |
| P4 | 3.0 | 11 | 0.860 | $C_8$ | 42 |
| P5 | 0.19 | | | $C_8$ | 39 |
| P6 | 0.21 | | | $C_8$ | 30 |

Example 1

Preparation of FPC

The FPC polymer used in the examples below (FPC-1) is Example 24 in Table 4, having an ethylene content of 15.76 wt % and a ML@125 C(1+4) of 19.9. The FPC was prepared as follows. Continuous polymerization was conducted in a 1 liter internal volume Continuous Flow Stirred Tank Reactor using hexane as the solvent. The liquid full reactor had a variable residence time of approximately 9 to 15 minutes (as described in the table below) and the pressure was maintained at 700 kpa. A mixed feed of Hexane, ethylene and propylene was pre-chilled to approximately −30° C. to remove the heat of polymerization, before entering the reactor. The pre-chilling temperature was adjusted to maintain indicated solution polymerization temperature. The solution of catalyst/activator in Toluene and the scavenger in hexane were separately and continuously admitted into the reactor to initiate the polymerization. The reactor temperature was maintained between 50 and 95° C. as described in the table below. The polymerization rate could be varied from 0.1 Kg/hr to 0.5 Kg/hr as indicated in the tables below.

Hexane at rate "A" (Kg/hr) (see below in Table 4) was premixed with both ethylene at rate "B" (g/hr) and propylene at rate "C" (g/hr) and fed to the reactor. The polymerization catalyst, dimethyl silyl bridged bis-indenyl Hafnium dimethyl, was activated in vitro in 1:1 molar ratio with NCA indicated below in the tables and introduced into the polymerization reactor at the rate of 0.0135 g/hr. Two NCA's were used: N', N'-Dimethyl anilinium-tetrakis(pentafluorophenyl)borate ("X1") and N, N'-Dimethyl anilinium-tetrakis(heptafluoro-1-napthyl)borate ("X2"). A dilute solution of triisobutyl aluminum was introduced into the reactor as a scavenger of catalyst terminators. A rate of approximately 1.11 mole of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The polymerization rate was measured to be at rate "D" (Kg/hr). The polymer produced in this polymerization was analysed for ethylene content by FT-IR, molecular weight averages by GPC. Crystallinity was measured by DSC and the amount of mm triads of propylene residues in the polymer chain was determined by $^{13}$C NMR. As we have mentioned above the crystallinity and mm triads determination are redundant determinations since the crystallinity of the polymers are dependant only on the isotactic propylene residues.

impact copolymer matrix. With the addition of the FPC (as shown in Samples 2 and 3) at low concentrations of 2% and 5% respectively, there was substantial improvement in room temperature (21° C.) Notched Izod impact (RTNI) and notched izod at low temperature (−30° C.) toughness. Com-

TABLE 4

Examples of synthesis of FPC

| | | Polymerization Reactor | | | | | | | | |
|---|---|---|---|---|---|---|---|---|---|---|
| | | Temp | | | | | Steady State C$_3$ | | Polymer | | |
| Ex. | NCA | (C.) | A Kg/hr | B G/hr | C G/hr | D Kg/hr | wt % in C$_6$ | C$_2$ wt % | Ml@127 C. | mp (C.) | Hf (J/g) |
| 19 | X2 | 60 | 3.56 | 75 | 812 | 0.49 | 10.8 | 13.70 | 15.3 | 45 | 19.3 |
| 20 | X2 | 60 | 3.56 | 75 | 812 | 0.44 | 12.3 | 14.70 | 16.1 | 46 | 11.14 |
| 21 | X2 | 60 | 3.56 | 75 | 812 | 0.41 | 13.2 | 17.92 | 20.6 | 46 | 10.6 |
| 22 | X2 | 70 | 3.56 | 75 | 812 | 0.43 | 12.7 | 16.10 | 11.6 | 47 | 8.6 |
| 23 | X2 | 70 | 3.56 | 65 | 812 | 0.35 | 14.5 | 14.70 | 16.6 | 46 | 13.5 |
| 24 | X2 | 70 | 3.56 | 60 | 812 | 0.36 | 14.1 | 13.57 | 16.9 | 46 | 15.8 |
| 24 | X2 | 70 | 3.56 | 58 | 812 | 0.26 | 16.4 | 15.76 | 19.9 | 46 | 13.4 |
| 26 | X2 | 80 | 3.56 | 75 | 812 | 0.50 | 11.1 | 16.20 | 6.7 | 45 | 16.5 |
| 27 | X2 | 80 | 3.56 | 70 | 812 | 0.45 | 12.2 | 15.97 | 7.9 | 45 | 15.5 |
| 28 | X2 | 80 | 3.56 | 70 | 812 | 0.40 | 13.3 | 15.41 | 11 | 46 | 12 |
| 29 | X2 | 90 | 3.56 | 75 | 812 | 0.49 | 11.1 | 14.32 | 4.1 | 46 | 15 |
| 30 | X2 | 90 | 3.56 | 75 | 812 | 0.41 | 13.2 | 16.15 | 4.8 | 49 | 7.3 |
| 31 | X2 | 90 | 3.56 | 67 | 812 | 0.36 | 14.2 | 14.94 | 5.2 | 46 | 13.2 |
| 32 | X2 | 90 | 3.56 | 60 | 812 | 0.28 | 16.0 | 15.26 | 6.6 | 46 | 9.8 |

Example 2

Preparation of P1, P2, P3 and P4

The following polymerization reactions were performed in a stirred, liquid filled 2 L jacketed steel reactor equipped to perform continuous insertion polymerization in presence of an inert hydrocarbon (hexane) solvent at pressures up to 120 bar and temperatures up to 240° C. The reactor was stirred during the polymerization. The reaction system was supplied with a thermocouple and a pressure transducer to monitor changes in temperature and pressure continuously, and with means to supply continuously purified ethylene, 1-octene, and solvent. In this system, ethylene dissolved in the hydrocarbon solvent, 1-octene, tri-n-octyl aluminum (TOA) used as a scavenger, and H$_2$ were pumped separately, mixed, and fed to the reactor as a single stream. The stream was refrigerated to below 0° C. The transition metal component (TMC) bis(4-triethylsilylphenyl)methylidene(cyclopentadienyl)(2,7-tertbutyl-fluorenyl)hafnium dimethyl was dissolved in a hexane/toluene mixture (9/1 vol/vol) whereas the ionic precursor of the non-coordinating anion (NCA) activator, which is dimethyl anilinium hydride tekakis(pentafluorophenyl)boron' was dissolved in a toluene/hexane mixture (1/1 vol/vol). Both components were pumped separately, mixed at ambient temperature, and cooled to below about 0° C. prior to entering the reactor. The reactor temperature was set by adjusting the temperature of the feed. Next, the polymer molecular weight or MI was controlled independently by adjusting the ethylene conversion in the reactor via the catalyst flow rate as well as the hydrogen feed to the reactor. Finally, the polymer density was controlled by adjusting the ethylene/1-octene weight ratio in the feed.

Example 3

TABLE 5 shows thermoplastic olefin compounds containing FPC in addition to the TPC impact modifier. The TPC was ECD 411 (3.5 MI) that is dispersed in a PP 7715E4 paring Sample 1 with 3, Notched Izod impact improves from 97 J/m to no break. Failure mode at low temperature (−30° C.) for the compounds containing the polymer compatibilizer was predominantly ductile. Samples 4 through 6 illustrate the effect of polymer compatibilizer (FPC) at a higher TPC concentration of 20 wt %. The addition of FPC substantially improves toughness. Additional comparative samples 7 to 9 contain formulations with 23 wt % polyethylene modifier content, demonstrating that at 23 wt % polyethylene, both room temperature (21° C.) toughness and low temperature (−30° C.) ductility was realized in the formulation (Example 7). The FPC addition (Samples 8 and 9) has little significant effect, since the formulations without the compatibilizer have good toughness. For completeness we have included a comparative example in the table, from U.S. Pat. No. 6,245,856.

Example 4

The data in TABLE 6 and TABLE 7 reflect a comparison of the effectiveness of the FPC in improving the Notched Izod (NI) properties of blends having the same PP 1074 with different types of TPC. A fundamental difference between the data in TABLE 6 and TABLE 7 is that in the former the TPC is an ethylene propylene copolymer while in the latter the TPC is an ethylene butene copolymer and an ethylene octane copolymer. Comparison of the data in TABLE 6 and TABLE 7 shows that the effect of the FPC in improving the Notched Izod of the overall composition is unexpectedly enhanced, i.e., is more effective, when the TPC is a copolymer of ethylene with an α-olefin of 4 or more carbon atoms than when the TPC is a copolymer of ethylene and propylene. Referring to TABLE 6, the EP elastomeric copolymer is an ethylene propylene polymer containing 65% ethylene and 42 ML(1+4)@125 C, and is described elsewhere herein as Vistalon 706. The data in TABLE 7 show the Notched Izod for compositions similar to those in TABLE 5, except that an ethylene butene elastomeric polymer (Exact 4033) containing 82% ethylene and 27 ML(1+4)@125 C and an ethylene octene elastomeric copolymer (Exact 5171) containing 64% ethylene and 23 ML(1+4)@125 C are used instead of the EP elastomeric polymer (Vistalon 706) in TABLE 6. Also, rather than varying PP 1075 along the range of 68 wt % to 79 wt % (as in TABLE 6), a single amount (70 wt %) was used.

Example 5

The data in TABLE 8 describe six compositions, each containing one of two different ethylene copolymers, each having an $C_4+$ α-olefin monomer (specifically octene) (P1 and P4) each separately blended with a single type of polypropylene (PP7805), without any FPC present. Composition properties are also shown.

Example 6

Referring to TABLE 9, the same polypropylene (PP 7805) used in TABLE 8 was blended with one of the ethylene/octene copolymers (P4) of TABLE 7, together with different amounts of FPC. Note the improvement in Notched Izod and Flexural Modulus, particularly in blends having more than 70 wt % PP present. For example, compare Samples 2D through 2G in TABLE 9 with Samples 1A and 1D in TABLE 8.

Example 7

Referring to TABLE 10, the same polypropylene (PP 7805) used in TABLE 8 was blended with the other ethylene/octene copolymer (P1) of TABLE 8, together with FPC. As in TABLE 9, an improvement in properties was observed.

Example 8

Referring to TABLE 11 (Examples 4A–4D), different types of polypropylenes were blended with one of two different ethylene/α-olefins, each having a different $C_4+$ (octene and hexene), without any FPC. In the same table (example 4E-4H) the same polypropylenes and ethylene/α-olefins in this example were blended with FPC. Note the improvement in Notched Izod. We point out that the values of the Notched Izod at 21 C in Examples 4E-4H of Table 11 are superior to the comparative examples in U.S. Pat. No. 6,245,856 (Kaufman) Example 12, Table VI which reports the properties of a TPO blend using an EP polymer and an FPC. The value of 145 J/m in the above U.S. Pat. No. 6,245,856 is equivalent to a Notched Izod impact strength of 2.7 ft-lb/in using a conversion of 1 ft.lb/in=53.4 J/m.

Example 9

Referring to TABLE 12 (Examples 8A and 8B) a single type of polypropylene (PP1105E1) was blended with two different ethylene/α-olefins, each having a different $C_4+$ (octene and butene), without any FPC. In Examples 9A–9I, the same polypropylenes and ethylene/α-olefin were blended with FPC. Note the improvement in Notched Izod and Flexural Modulus. The data show similar improvements for ethylene elastomers containing $C_4$ or $C_8$ comonomers though this improvement is much larger than that observed for ethylene elastomers containing propylene as comonomer as has been demonstrated elsewhere.

Example 10

Referring to TABLE 13, certain TPO samples were made using one of three different polypropylenes blended with one of two different types of ethylene/α-olefins. Two of the samples (11G and 11H) included FPC. These samples show improved Notched Izod Impact strength compared to the corresponding samples which do not have the FPC. Again in TABLE 13 (examples 14B through 14E) three different types of polypropylene were blended with two different ethylene/α-olefins, each having a different $C_4+$ (octene), without any FPC present. Referring to TABLE 13 again (Examples 15A through 15D), certain TPO samples were made using the same two different polypropylenes blended with one of four different types of ethylene/α-olefins, together with 5 wt % FPC. This shows that the efficacy of the addition of the FPC to the improved Notched Izod impact strength extends over a wide range of the MFR of the iPP and for both $C_4$ and $C_8$ containing elastomers.

Example 11

Referring to TABLE 14, certain samples were made using a single type of polypropylene blended with one of two different types of ethylene/α-olefins (both with hexene), together with 2 wt % FPC. Addition of FPC improved the Notched Izod impact strength of the blends.

Example 12

Referring to TABLE 15, certain samples were made using a single type of polypropylene and one of five different types of ethylene/α-olefins. In all cases where the amount of the SPC is maintained at 70% by weight the addition of 3 wt % FPC leads to an improvement in the Noched izod impact Strength. In particular, most illustrative examples of the effect of addition of the FPC is Table 15, Example 21C and 21D where the addition of 2 wt % FPC allows the formation of TPO formulation with the better impact properties and a higher flexural modulus at a lower level of the TPC.

Example 13

Referring to TABLE 16, TPO samples were made using PP1105E1 as the SPC. Different TPC containing both butene and octene as comonomer were used. In all cases the addition of the FPC in small amounts lead to improvements in the impact strength. In particular, most illustrative examples of the effect of addition of the FPC is the comparison of Table 16, Example 24F to 24H to 25F where the addition of 2.8 wt % FPC allows the formation of TPO formulation with the better impact properties and a higher flexural modulus at a lower level of the TPC. A similar comparison can be made with example 24G to 24I to 25F. In these cases the improvement in the notched izod impact strength improves from low numbers to a no break.

Example 14

Referring to TABLE 17, TPO samples were made three different polypropylenes blended with same ethylene copolymes as TPC both in the presence and the absence of the FPC. In all cases the addition of the FPC leads to improved Notched Izod Impact strength in comparison with the samples that lacked FPC.

Example 15

The NI ratio and the FM ratio of the various compositions in the above examples have been tabulated in TABLE 18. In each case "comparative" data have been assembled next to example data. The general tendency observed is that addition of FPC reflects a preferential increase of the NI ratio over the FM ratio.

TABLE 5

| Samples | 1 | 2 | 3 | 4 | 5 | 6 | 7 | 8 | 9 | Ex 10 U.S. Pat. No. 6245856 |
|---|---|---|---|---|---|---|---|---|---|---|
| PP 7715 E4 (SPC) | 83 | 81 | 78 | 80 | 78 | 75 | 77 | 75 | 72 | 70* |
| ECD 411 (TPC) | 17 | 17 | 17 | 20 | 20 | 20 | 23 | 23 | 23 | 20* |
| Compatibilizer comp. (FPC) | 0 | 2 | 5 | 0 | 2 | 5 | 0 | 2 | 5 | 10* |
| Notched Izod Impact @ °C. (J/m) | | | | | | | | | | |
| 21.0 | 97.7 | 159.1 | NB | 121.2 | NB | NB | NB | NB | NB | 524 |
| −30.0 | 40.6 | 44.9 | 44.3 | 41.0 | 44.5 | 46.7 | 47.2 | 55.5 | 57.1 | 70 |
| Instrumented Impact/ −30° C./24 km/h | | | | | | | | | | |
| Total Energy (J) | 7.7 | 8.2 | 7.9 | 8.0 | 8.0 | 8.2 | 7.7 | 7.9 | 7.9 | |
| Failure Type | 4D, 1DB | 5D | 5D | 5D | 5D | 5D | 5D | 5D | 5D | |
| Instrumented Impact/ −40° C./24 mph | | | | | | | | | | |
| Total Energy (J) | 4.4 | 3.5 | 3.6 | 5.1 | 4.8 | 6.0 | 6.9 | 6.6 | 6.5 | |
| Failure Type | 4BD, 1DB | 5BD | 5BD | 5BD, 2DB, 1D | 5DB, 3BD | 1D, 2DB, 2BD | 3D, 2DB | 2D, 2DB, 1BD | D, 1DB, 2BD | |
| Flexural Modulus (MPa) @ 1.3 mm/min | | | | | | | | | | |
| 1% Secant | 1193 | 1069 | 952 | 1097 | 1021 | 834 | 993 | 924 | 821 | 779 |
| Tangent | 1214 | 1110 | 1007 | 1214 | 1076 | 841 | 1028 | 979 | 883 | 814 |
| Tensile Strength @ 51 mm/min | | | | | | | | | | |
| @ Yield (MPa) | 23.7 | 22.1 | 21.8 | 23.6 | 22.8 | 21.4 | 21.4 | 21.9 | 20.6 | 7.3 |
| Young's Modulus (MPa) | 1365 | 1177 | 1164 | 1388 | 1298 | 1080 | 1275 | 1165 | | 6.5 |
| Elongation (%) @ 51 mm/min | | | | | | | | | | |
| Yield | 7 | 9.1 | 11.5 | 8.1 | 10 | 13.3 | 10.5 | 12 | 14.8 | 18 |
| Break | 60 | 139 | 680 | 121 | 352 | 694 | 511 | 672 | 68.1 | 966 |
| MFR (g/10 min) | 26.7 | 24.4 | 20.5 | 26.1 | 24.3 | 21.6 | 25 | 22.2 | 20.8 | 24.2 |
| Wt % $C_2$ | 22.75 | 22.89 | 23.11 | 25.20 | 25.34 | 25.56 | 27.65 | 27.79 | 28.00 | |
| F2 | 0.03999 | 0.0728 | 0.3482 | 0.0379 | 0.2207 | 0.25508 | 0.1600 | 0.1737 | 0.1968 | |

NB = No Break;
D = Ductile,
B = Brittle,
BD = Brittle Ductile,
DB = Ductile Brittle
*note that the example from U.S. Pat. No. 6,245,856 which uses for blend components a polypropylene homopolymer as the polypropylene component, an ethylene propylene vinyl norbornene polymer with 57 wt % ethylene, 1.5 wt % VNB and the balance propylene, the compatibilizer is a polymer with a 33 Mooney viscosity and 12.4 wt % ethylene.

TABLE 6

| Composition | | | | | | | | | |
|---|---|---|---|---|---|---|---|---|---|
| PP 1074 (wt %) | 68 | 68 | 68 | 73.5 | 72.3 | 72.7 | 72.8 | 79 | 79 |
| Vistalon 706 (wt %) | 32 | 27 | 29.6 | 21.5 | 27.6 | 23.7 | 24.8 | 21 | 16 |
| FPC 1 (wt %) | 0 | 5 | 2.33 | 5 | 0 | 3.5 | 2.4 | 0 | 5 |
| Properties | | | | | | | | | |
| NI | 0.53 | 4.45 | 0.82 | 2.16 | 0.86 | 2.84 | 1.38 | 0.46 | 1.38 |
| FM (1% secant) | 127 | 109 | 112 | 115 | 121 | 124 | 125 | 142 | 132 |
| MFR (g/10 min) | 16.7 | 16.3 | 12.0 | 14.2 | 15.6 | 16.3 | 18.1 | 17.8 | 17.5 |

TABLE 7

| Composition | | | | | | | | | | | | |
|---|---|---|---|---|---|---|---|---|---|---|---|---|
| FPC 1 | 0 | 0.9 | 1.5 | 2.1 | 3 | 4.5 | 0 | 0.9 | 1.5 | 2.1 | 3 | 4.5 |
| Exact 4033 | 30 | 29.1 | 28.5 | 27.9 | 27 | 25.5 | | | | | | |
| Exact 5171 | | | | | | | 30 | 29.1 | 28.5 | 27.9 | 27 | 25.5 |
| PP 1074 | 70 | 70 | 70 | 70 | 70 | 70 | 70 | 70 | 70 | 70 | 70 | 70 |
| Properties | | | | | | | | | | | | |
| NI | 2.300 | 3.161 | 8.236 | 7.624 | 5.980 | 11.62 | 1.638 | 3.244 | 9.772 | 12.98 | 12.38 | 13.21 |
| FM (1% secant) | 106 | 111 | 107 | 106 | 107 | 99 | 125 | 113 | 106 | 99 | 99 | 93 |
| MFR (g/10 min) | 14.2 | 16.0 | 15.4 | 15.5 | 16.0 | 15.6 | 18.4 | 17.2 | 17.3 | 17.0 | 17.6 | 16.75 |

TABLE 8

| | Examples | | | | | |
|---|---|---|---|---|---|---|
| | 1A | 1B | 1C | 1D | 1E | 1F |
| P1 (TPC) | 25 | 30 | 35 | | | |
| P4 (TPC) | | | | 25 | 30 | 35 |
| PP 7805 (SPC) | 75 | 70 | 65 | 75 | 70 | 65 |
| Notched Izod Impact @ C. (ft-lb/in) | | | | | | |
| 21 C. | 3.7 | 3.9 | 4.1 | 3.0 | 5.2 | 3.6 |
| 0 C. | 2.2 | 3.1 | 4.3 | 1.8 | 2.8 | 4.2 |
| −18 C. | 1.8 | 2.7 | 3.3 | 1.5 | 2.3 | 3.8 |
| −29 C. | 1.52 | 2.15 | 3.02 | 1.3 | 1.9 | 2.7 |
| Flexural Modulus (Kpsi) @ 0.05 in/min | | | | | | |
| 1% Secant | 143 | 125 | 111 | 144 | 130 | 116 |
| Tangent | 145 | 129 | 114 | 147 | 138 | 116 |
| MFR (g/10 min) | 33.5 | 27.7 | 22.7 | 42.3 | 36.7 | 34.4 |
| HDT (° C.) | | | | | | |
| @66 psi | 94.6 | 87.9 | 84.4 | 100.1 | 99.8 | 98.5 |
| @264 psi | 54.9 | 53.4 | 53.6 | 57.7 | 49.7 | 48.3 |
| Wt % C$_2$ | 16.75 | 19.5 | 22.25 | 16.75 | 19.5 | 22.25 |
| F2 | 0.038 | 0.023 | 0.016 | 0.032 | 0.032 | 0.014 |
| MFR * FM | 4790 | 3462 | 2519 | 6091 | 4771 | 3990 |

TABLE 9

| | Examples | | | | | | | | | | |
|---|---|---|---|---|---|---|---|---|---|---|---|
| | 2A | 2B | 2C | 2D | 2E | 2F | 2G | 2H | 2I | 2J | 2K |
| P4 (TPC) | 30 | 30 | 26.2 | 22.5 | 18.7 | 15 | 15 | 18 | 18 | 15 | 15 |
| PP 7805 (SPC) | 68 | 68 | 68.7 | 72.5 | 76.2 | 77 | 77 | 80 | 80 | 80 | 80 |
| FPC- | 2 | 2 | 5 | 5 | 5 | 8 | 8 | 2 | 2 | 5 | 5 |
| Notched Izod Impact @ C. (ft-lb/in) | | | | | | | | | | | |
| 21 | 13.6 | 13.5 | 14.1 | 13.4 | 13.2 | 12.4 | 13.0 | 3.0 | 3.8 | 12.2 | 5.2 |
| 0 | 14.0 | 13.9 | 15.0 | 13.1 | 3.4 | 2.3 | 2.5 | 1.6 | 1.7 | 2.3 | 2.0 |
| −18 | 13.6 | 2.4 | 13.5 | 2.3 | 2.1 | 1.5 | 1.9 | 1.3 | 1.3 | 1.4 | 1.4 |
| −29 | 2.0 | 2.3 | 2.8 | 2.1 | 1.6 | 1.3 | 1.4 | 1.0 | 1.0 | 1.3 | 1.2 |
| Instrumented Impact/−30 C./ 15 mph/25 lbs | | | | | | | | | | | |
| Total Energy (ft-lb) | 25.3 | 28.5 | 31.8 | 31.0 | 30.6 | 32.5 | 32.2 | 25.3 | 22.8 | 30.9 | 22.5 |
| Max Energy (ft-lb) | 14.9 | 17.7 | 20.1 | 18.8 | 17.4 | 18.7 | 18.2 | 16.5 | 18.6 | 17.9 | 17.3 |
| Failure Type | 5D | 5D | 5D | 5D | 5D | 5D | 5D | 2D, 2DB, 1B | 3DB, 2BD | 5D | 1D, 1DB, 1BD, 2B |
| Flexural Modulus (Kpsi) @ 0.05 in/min | | | | | | | | | | | |
| 1% Secant | 129 | 133 | 122 | 134 | 145 | 156 | 149 | 178 | 172 | 170 | 161 |
| Tangent | 138 | 140 | 134 | 136 | 157 | 157 | 149 | 177 | 178 | 161 | 154 |

TABLE 9-continued

| | Examples | | | | | | | | | | |
|---|---|---|---|---|---|---|---|---|---|---|---|
| | 2A | 2B | 2C | 2D | 2E | 2F | 2G | 2H | 2I | 2J | 2K |
| Elongation (%) @ 2 in/min | | | | | | | | | | | |
| yield | 6.2 | 5.5 | 6.3 | 5.7 | 4.9 | 4.9 | 5.1 | 4.3 | 4.8 | 5.4 | 5.2 |
| break | 127 | 111 | 80 | 151 | 51 | 64.1 | 87.1 | 51 | 58 | 77.8 | 75 |
| MFR (g/10 min) | 34.1 | 32.8 | 32.1 | 33.7 | 38.2 | 30.7 | 39.6 | 46.8 | 40.6 | 44.9 | 44.4 |
| HDT (° C.) | | | | | | | | | | | |
| @66 psi | 94.7 | 86.9 | 85.7 | 90.7 | 96.4 | 95.5 | 93.3 | 101.2 | 101.5 | 96.4 | 98.2 |
| @264 psi | 48.3 | 48.2 | 47.5 | 47.9 | 50.1 | 50.7 | 50.5 | 52.6 | 52.9 | 51.2 | 52.2 |
| Wt % $C_2$ | 19.7 | 19.7 | 18.0 | 15.9 | 13.1 | 12.2 | 12.2 | 13.14 | 13.14 | 11.85 | 11.85 |
| F2 | 0.089 | 0.088 | 0.159 | 0.274 | 0.694 | 8.057 | 8.465 | 0.153 | 0.196 | 4.847 | 2.040 |
| MFR * FM | 4398 | 4362 | 3916 | 4515 | 5539 | 4789 | 5900 | 8330 | 6983 | 7633 | 7148 |

TABLE 10

| | Example | | | | | | | | | | |
|---|---|---|---|---|---|---|---|---|---|---|---|
| | 3A | 3B | 3C | 3D | 3E | 3F | 3G | 3H | 3I | 3J | 3K |
| P1 (TPC) | 27 | 30 | 30 | 26.2 | 22.5 | 18.7 | 15 | 15 | 18 | 27 | 27 |
| PP 7805 (SPC) | 65 | 65 | 68 | 68.7 | 72.5 | 76.2 | 77 | 80 | 80 | 65 | 65 |
| FPC | 8 | 5 | 2 | 5 | 5 | 5 | 8 | 5 | 2 | 8 | 8 |
| Notched Izod Impact @ C. (ft-lb/in) | | | | | | | | | | | |
| 21 | 14.1 | 14.7 | 14.5 | 14.4 | 13.4 | 11.6 | 11.3 | 3.1 | 2.8 | 14.3 | 14.2 |
| 0 | 15.4 | 16.1 | 14.2 | 14.9 | 3.5 | 2.6 | 2.4 | 1.7 | 1.7 | 15.4 | 15.5 |
| −18 | 15.9 | 10.7 | 3.6 | 3.9 | 2.5 | 2.0 | 1.7 | 1.3 | 1.3 | 14.0 | 14.3 |
| −29 | 3.6 | 3.5 | 2.7 | 2.7 | 1.9 | 1.7 | 1.4 | 1.1 | 1.1 | 2.5 | 14.5 |
| Instrumented Impact/−30 C./ 15 mph/25 lbs | | | | | | | | | | | |
| Total Energy (ft-lb) | 26.7 | 28.2 | 32.2 | 28.5 | 29.0 | 31.0 | 31.4 | 26.80 | 28.84 | 28.43 | 27.47 |
| Max Energy (ft-lb) | 15.3 | 17.0 | 20.2 | 16.2 | 16.5 | 17.5 | 18.2 | 18.91 | 18.14 | 15.99 | 15.38 |
| Failure Type | 5D | 5D | 5D | 5D | 5D | 5D | 5D | 2D, 2DB, 1BD | 5D | 5D | 5D |
| Flexural Modulus (Kpsi) @ 0.05 in/min | | | | | | | | | | | |
| 1% Secant | 106 | 109 | 125 | 121 | 139 | 148 | 152 | 171 | 173 | 120 | 117 |
| Tangent | 108 | 112 | 130 | 125 | 139 | 161 | 165 | 179 | 174 | 128 | 113 |
| MFR (g/10 min) | 20.5 | 20.9 | 24.2 | 25.6 | 29.2 | 31.0 | 33.4 | 39.02 | 40 | 32.1 | 30.5 |
| HDT (° C.) | | | | | | | | | | | |
| @66 psi | 79.4 | 79.0 | 83.4 | 82.1 | 96.0 | 100. | 109. | 115.9 | 101.0 | 87.0 | 87.8 |
| @264 psi | 45.1 | 45.9 | 46.3 | 46.9 | 47.9 | 50.3 | 50.0 | 52.3 | 52.4 | 47.1 | 46.1 |
| Wt % $C_2$ | 18.8 | 20.1 | 19.7 | 18.0 | 15.9 | 13.9 | 12.2 | 11.85 | 13.14 | 18.81 | 18.81 |
| F2 | 0.163 | 0.107 | 0.095 | 0.162 | 0.274 | 0.611 | 7.401 | 1.22 | 0.144 | 0.165 | 0.165 |
| MFR * FM | 2173 | 2286 | 3036 | 3100 | 4062 | 4595 | 5078 | 6672 | 6920 | 3852 | 3568 |

TABLE 11

| | Example 4 | | | | | | | |
|---|---|---|---|---|---|---|---|---|
| | 4A | 4B | 4C | 4D | 4E | 4F | 4G | 4H |
| ECD 411 =(TPC) | 21 | 21 | 21 | 21 | 17 | 17 | 17 | 17 |
| P3 (=TPC) | 9 | 9 | 9 | 9 | 8 | 8 | 8 | 8 |
| FPC 1 | | | | | 5 | 5 | 5 | 5 |
| SPC 1 | 70 | | | | 70 | | | |
| SPC 2 | | 70 | | | | 70 | | |
| SPC 3 | | | 70 | | | | 70 | |
| SPC 4 | | | | 70 | | | | 70 |

TABLE 11-continued

| | Example 4 | | | | | | | |
|---|---|---|---|---|---|---|---|---|
| | 4A | 4B | 4C | 4D | 4E | 4F | 4G | 4H |
| Notched Izod Impact @ C. (ft-lb/in) | | | | | | | | |
| 21 | 4.9 | 1.6 | 0.9 | 1.0 | 16 | 4.7 | 4.1 | 3.5 |
| 0 | 0.9 | 0.6 | 0.5 | 0.5 | 1.2 | 1.0 | 0.9 | 0.8 |
| −18 | 0.5 | 0.4 | 0.4 | 0.4 | 0.4 | 0.5 | 0.5 | 0.5 |
| −29 | 0.4 | 0.4 | 0.4 | 0.4 | 0.4 | 0.4 | 0.4 | 0.4 |
| Instrumented Impact/ −30 C./15 mph/25 lbs | | | | | | | | |
| Total Energy (ft-lb) | 8.0 | 2.6 | 2.4 | 2.3 | 14.2 | 8.3 | 5.2 | 9.5 |
| Failure Type | 4BD, 1D | 5B | 5B | 5B | 4BD, 1D | 3BD, 2B | 4BD, 1B | 3BD, 2B |
| Flexural Modulus (Kpsi) @ 0.05 in/min | | | | | | | | |
| 1% Secant | 138 | 146 | 138 | 138 | 132 | 131 | 122 | 124 |
| Tangent | 144 | 146 | 151 | 145 | 141 | 129 | 127 | 131 |
| MFR (g/10 min) | 4.9 | 9.0 | 12.8 | 19.9 | 4.4 | 8.7 | 12.2 | 17.8 |
| Wt % $C_2$ | 24.765 | 24.765 | 24.738 | 24.76 | 21.3 | 19.015 | 21.28 | 21.3 |
| F2 | 0.216 | 0.069 | 0.040 | 0.042 | 2.888 | 0.569 | 0.743 | 0.637 |
| MFR * FM | 676.2 | 1314 | 1768 | 2750 | 580.8 | 1134.5 | 1483.5 | 2202.2 |

TABLE 12

| | Example | | | | | |
|---|---|---|---|---|---|---|
| | 9A | 9B | 9C | 9D | 9E | 9F |
| FPC | 0.9 | 0.9 | 1.5 | 1.5 | 2.1 | 2.1 |
| EXACT 4033 (=TPC) | 29.1 | | 28.5 | | 27.9 | |
| P3 (=TPC) | | 29.1 | | 28.5 | | 27.9 |
| PP 1105 E1 (=SPC) | 70 | 70 | 70 | 70 | 70 | 70 |
| Notched Izod Impact @ C. (ft-lb/in) | | | | | | |
| RT | 3.161 | 3.244 | 8.236 | 9.772 | 7.624 | 12.985 |
| 0 | 1.457 | 1.591 | 1.924 | 1.962 | 1.963 | 3.243 |
| −18 | 1.465 | 1.445 | 1.629 | 1.639 | 1.555 | 1.321 |
| −29 | 1.378 | 1.474 | 1.506 | 1.571 | 1.529 | 1.205 |
| Instrumented Impact/ −29 C./15 mph/25 lbs | | | | | | |
| Total Energy (ft-lb) | 32.4 | 33.7 | 33.2 | 32.4 | 33.3 | 33.7 |
| Failure Type | 5D | 5D | 5D | 5D | 5D | 5D |
| Flexural Modulus (Kpsi) @ 0.05 in/min | | | | | | |
| 1% Secant | 111 | 113 | 107 | 106 | 106 | 99 |
| Tangent | 115 | 111 | 110 | 107 | 109 | 104 |
| HDT @66 psi | 73.8 | 74.9 | 73.2 | 71.8 | 70.8 | 70.8 |
| MFR (g/10 min) | 16.0 | 17.2 | 15.4 | 17.3 | 15.5 | 17.0 |
| Wt % $C_2$ | 24.91 | 18.53 | 25.11 | 18.15 | 25.31 | 17.77 |
| F2 | 0.193 | 0.054 | 0.606 | 0.199 | 0.706 | 0.297 |
| MFR * FM | 1777 | 2074.7 | 1644.6 | 1823.2 | 1647 | 1712.7 |

| | Example | | | | | |
|---|---|---|---|---|---|---|
| | 9G | 9H | 9I | 9J | 8A | 8B |
| FPC | 3 | 3 | 4.5 | 4.5 | | |
| EXACT 4033 (=TPC) | 27 | | 25.5 | | 30 | |
| P3 (=TPC) | | 27 | | 25.5 | | 30 |
| PP 1105 E1 (=SPC) | 70 | 70 | 70 | 70 | 70 | 70 |
| Notched Izod Impact @ C. (ft-lb/in) | | | | | | |
| RT | 5.991 | 12.381 | 11.620 | 13.216 | 2.330 | 1.638 |
| 0 | 1.882 | 2.532 | 2.128 | 2.726 | 2.052 | 1.286 |
| −18 | 0.885 | 1.089 | 0.996 | 1.266 | 1.571 | 1.172 |
| −29 | 0.825 | 1.038 | 0.901 | 1.079 | 1.461 | 1.152 |

TABLE 12-continued

| Instrumented Impact/ −29 C./15 mph/25 lbs | | | | | | |
|---|---|---|---|---|---|---|
| Total Energy (ft-lb) | 33.7 | 34.5 | 32.0 | 33.23 | 33.7 | 34.3 |
| Failure Type | 5D | 5D | 5D | 5D | 5D | 5D |
| Flexural Modulus (Kpsi) @ 0.05 in/min | | | | | | |
| 1% Secant | 107 | 99 | 99 | 93 | 106 | 125 |
| Tangent | 112 | 94 | 101 | 96 | 111 | 121 |
| HDT @66 psi | 77.5 | 71.9 | 70.2 | 69.8 | 74 | 77.2 |
| MFR (g/10 min) | 16.0 | 17.6 | 15.6 | 16.75 | 14.2 | 18.4 |
| Wt % $C_2$ | 25.62 | 17.19 | 26.13 | 16.24 | 24.6 | 19.11 |
| F2 | 0.61 | 0.803 | 2.494 | 0.362 | 0.24 | 0.031 |
| MFR * FM | 1714.1 | 1678.0 | 1542.4 | 1634.9 | 1505 | 2295 |

TABLE 13

| | Example | | | | | | |
|---|---|---|---|---|---|---|---|
| | 11B | 11C | 11D | 11E | 11F | 11G | 11H |
| PP1074 (=SPC) | | | 70 | | | | |
| PP 1105E2 (=SPC) | 70 | | | 70 | | | |
| 70 MFR PP (=SPC) | | 70 | | | 70 | 70 | 70 |
| P5 (=TPC) | | | | | | | |
| P6 (=TPC) | | | | | | | |
| EXACT 4033 (=TPC) | 30 | 30 | | | | 25 | |
| EXACT 8201 (=TPC) | | | 30 | 30 | 30 | | 25 |
| FPC 1 | | | | | | 5 | 5 |
| Notched Izod Impact @ C. (ft-lb/in) | | | | | | | |
| 21 | 1.0 | 1.0 | 1.2 | 1.0 | 0.95 | 1.9 | 1.6 |
| −30 | 0.4 | 0.5 | 1.0 | 0.5 | 0.5 | 0.7 | 0.6 |
| Dynatup Impact/−40 C. | | | | | | | |
| Total Energy (ft-lb) | 26.8 | 15.8 | 26.4 | 8.1 | 5.4 | 24.5 | 31.9 |
| Failure Type | 1BD, 4D | 5BD | 3BD, 1 DB, 1D | 5BD | 5BD | 3BD, 2D | 2DB, 3D |
| Flexural Modulus (Kpsi) @ 0.5 in/min | | | | | | | |
| 1% Secant | 121.7 | 156 | 154 | 117 | 161 | 147 | 158 |
| Tangent | 127.5 | 160 | 159 | 122 | 165 | 153 | 165 |
| MFR (g/10 min) | 16.7 | 21.6 | 17.9 | 17.9 | | 18.4 | 21.9 |
| Wt % $C_2$ | 24.6 | 24.6 | 21.21 | 21.2 | 21.21 | 21.25 | 18.475 |
| F2 | 0.0411 | 0.0417 | 0.0324 | 0.0269 | 0.0255 | 0.337 | 0.171 |
| MFR * FM | 2025.2 | 3369 | 2750 | 2089 | 2817 | 2704 | 3460 |

| | Example | | | | | | |
|---|---|---|---|---|---|---|---|
| | 14B | 14C | 14E | 15A | 15B | 15C | 15D |
| PP1074 (=SPC) | | | | | | | |
| PP 1105E2 (=SPC) | 70 | | | 70 | 70 | | |
| 70 MFR PP (=SPC) | | 70 | 70 | | | 70 | 70 |
| P5 (=TPC) | 30 | 30 | | | | 25 | |
| P6 (=TPC) | | | 30 | | | | 25 |
| EXACT 4033 (=TPC) | | | | 25 | | | |
| EXACT 8201 (=TPC) | | | | | 25 | | |
| FPC 1 | | | | 5 | 5 | 5 | 5 |

TABLE 13-continued

| Notched Izod Impact @ C. (ft-lb/in) | | | | | | | |
|---|---|---|---|---|---|---|---|
| 21 | 1.3 | 0.8 | 0.5 | 1.9 | 1.9 | 2.2 | 2.3 |
| −30 | 0.6 | 0.5 | 0.4 | 0.6 | 0.6 | 0.8 | 0.8 |
| Dynatup Impact/−40 C. | | | | | | | |
| Total Energy (ft-lb) | 33.2 | 13.9 | 2.5 | 36.9 | 32.5 | 31.3 | 3.1 |
| Failure Type | (4D, 1DB) | (5BD) | (5B) | (5D) | (3DB, 2D) | (3D, 2DB) | (5B) |
| Flexural Modulus (Kpsi) @ 0.5 in/min | | | | | | | |
| 1% Secant | 111 | 137 | 142 | 104 | 105 | 142 | 139 |
| Tangent | 111 | 143 | 145 | 104 | 106 | 141 | 140 |
| MFR (g/10 min) | 12.0 | 16.2 | 17.7 | 15.3 | 17.0 | 16.7 | 16.4 |
| Wt % $C_2$ | 18.3 | 18.3 | 21 | 21.3 | 18.5 | 16.25 | 18.25 |
| F2 | 0.0209 | 0.0126 | 0.0123 | 0.343 | 0.209 | 0.136 | 0.238 |
| MFR * FM | 1855 | 2226 | 2515 | 1799 | 1588 | 2377 | 2279 |

TABLE 14

| | Example | | |
|---|---|---|---|
| | 19A | 18A | 18B |
| PP 7715 (=SPC) | 81 | 83 | 80 |
| ECD 411 (=TPC) | 17 | 17 | 20 |
| FPC-1 | 2 | | |
| Notched Izod Impact @ C. (ft-lb/in) | | | |
| 21 | 2.98 | 1.83 | 2.27 |
| −30 | 0.8 | 0.8 | 0.8 |
| Instrumented Impact/−40 C. | | | |
| Total Energy (ft-lb) | 16.5 | 21.1 | 24.3 |
| Failure Type | 5BD | 4BD, 1DB | 5BD, 2DB, 1D |
| Flexural Modulus (Kpsi) @ 0.05 in/min | | | |
| 1% Secant | 155 | 173 | 159 |
| Tangent | 161 | 176 | 176 |
| MFR (g/10 min) | 24.4 | 26.7 | 26.1 |
| Wt % $C_2$ | 22.813 | 22.689 | 25.14 |
| F2 | 0.0704 | 0.0388 | 0.0371 |
| MFR * FM | 3782 | 4619 | 4149 |

TABLE 15

| | Example | | | | | | | | |
|---|---|---|---|---|---|---|---|---|---|
| | 23C | 23D | 23E | 23F | 22C | 22D | 22E | 21C | 20D |
| EXACT 4033 (TPC) | 27 | | | | 30 | | | | |
| P1 (=TPC) | | 27 | | | | 30 | | | |
| P3 (=TPC) | | | 27 | | | | 30 | | |
| Engage 8100 | | | | | | | | 23 | 30 |
| PX 2 (=TPC) | | | | 27 | | | | | |
| PP 1105 E1 (SPC) | 70 | 70 | 70 | 70 | 70 | 70 | 70 | 75 | 70 |
| FPC-1 | 3 | 3 | 3 | 3 | | | | 2 | |
| Notched Izod Impact @ C. (ft-lb/in) | | | | | | | | | |
| 23 | 8.4 | 12.7 | 13.5 | 1.82 | 0.9 | 1.3 | 5.2 | 1.3 | 1.2 |
| 0 | 1.4 | 2.1 | 10.5 | 0.8 | 0.6 | 0.9 | 1.2 | | 0.6 |
| −18 | 1.0 | 1.2 | 1.4 | 0.5 | 0.5 | 0.7 | 0.9 | | |
| −29 | 1.0 | 1.2 | 1.2 | 0.4 | 0.4 | 0.7 | 0.8 | 0.6 | |
| −40 | 0.7 | 0.9 | 0.9 | 0.4 | 0.4 | 0.5 | 0.6 | | |
| Instrumented Impact/−40 C./7.5 mph/50 lb | | | | | | | | | |
| Total Energy (ft-lb) | 33.25 | 33.24 | 32.76 | 6.1 | 17.11 | 29.63 | 27.84 | 24.6 | 25.2 |
| Max Energy (ft-lb) | 18.94 | 18.58 | 18.42 | 5.51 | 13.72 | 19.35 | 18.59 | | |
| Failure Type | 5D | 5D | 5D | 5B | 2DB, 3B | 3D, 1DB, 1B | 3D, 1DB, 1BD | 2DB, 2B D, 1D | 2D, 2BD, 1DB |

TABLE 15-continued

| | Example | | | | | | | | |
|---|---|---|---|---|---|---|---|---|---|
| | 23C | 23D | 23E | 23F | 22C | 22D | 22E | 21C | 20D |
| Flexural Modulus (Kpsi) @ 0.05 in/min | | | | | | | | | |
| 1% Secant | 106 | 107 | 94 | 113 | 124 | 120 | 104 | 112 | 106 |
| 1% tangent | 107 | 109 | 92 | 115 | 133 | 119 | 107 | 111 | 111 |
| HDT@64 psi (C) | 72.3 | 67.7 | 64.1 | 71.5 | 76.2 | 70.4 | 67.7 | | |
| HDT @ 264 psi (C) | 44.2 | 43.4 | 42.9 | 46 | 46.9 | 45.0 | 43.9 | | |
| MFR (g/10 min) | 15.4 | 15.2 | 14.8 | 16.9 | 15.8 | 14.7 | 18.1 | | |
| Wt % C$_2$ | 22.6 | 17.355 | 17.679 | 22.539 | 24.6 | 18.75 | 19.11 | 14.58 | 18.6 |
| F2 | 0.762 | 0.455 | 0.518 | 0.164 | 0.0411 | 0.022 | 0.098 | 0.1719 | 0.0201 |
| MFR * FM | 1631 | 1624 | 1391 | 1911 | 1964 | 1768 | 1881 | 1691 | 1568 |

TABLE 16

| | Example | | | | | | | |
|---|---|---|---|---|---|---|---|---|
| | 28D | 29D | 24C | 24D | 24E | 24F | 24G | 24H |
| ECD 411 | 30 | 27 | | | | | | |
| EXACT 4033 | | | 25 | | | | | |
| P1 | | | | 25 | | | | |
| P3 | | | | | 25 | | | |
| ENGAGE 8180 | | | | | | 25 | | |
| ENGAGE 8842 | | | | | | | 25 | |
| PP 1105 E1 | 70 | 70 | 75 | 75 | 75 | 75 | 75 | 70 |
| FPC | | 3 | | | | | | |
| Notched Izod Impact @ C. (ft-lb/in) | | | | | | | | |
| 21 | 0.5 | 0.9 | 0.69 | 0.92 | 0.82 | 1.00 | 1.30 | 1.40 |
| 0 | 0.4 | 0.5 | 0.58 | 0.62 | 0.64 | 0.73 | 0.50 | 0.89 |
| −18 | 0.4 | 0.4 | 0.48 | 0.57 | 0.50 | 0.57 | 0.75 | 0.74 |
| −29 | 0.3 | 0.3 | 0.41 | 0.52 | 0.48 | 0.59 | 0.59 | 0.84 |
| −40 | | | 0.42 | 0.43 | 0.48 | 0.58 | 0.72 | 0.50 |
| Flexural Modulus (Kpsi) @ 0.05 in/min | | | | | | | | |
| 1% Secant | 133 | 124 | 123 | 117 | 117 | 116 | 121 | 103 |
| Tangent | 136 | 126 | 125 | 119 | 112 | 115 | 122 | 102 |
| MFR (g/10 min) | 22.0 | 20.6 | 16.2 | 16.4 | 18.6 | 18.0 | 18.5 | 15.3 |
| Wt % C$_2$ | 27.2 | 25 | 20.5 | 15.625 | 15.925 | 14.5 | 13.75 | 17.4 |
| F2 | 0.0267 | 0.0546 | 0.1095 | 0.0514 | 0.0498 | 0.0396 | 0.0395 | 0.0185 |
| MFR * FM | 2930 | 2548 | 1992 | 1912 | 2170 | 2083 | 2239 | 1575 |

| | Example | | | | | | | |
|---|---|---|---|---|---|---|---|---|
| | 24I | 25C | 25D | 25E | 25F | 25G | 25H | 25I |
| ECD 411 | | | | | | | | |
| EXACT 4033 | | 22.2 | | | | | | |
| P1 | | | 22.2 | | | | | |
| P3 | | | | 22.2 | | | | |
| ENGAGE 8180 | | | | | 22.2 | | 27.0 | |
| ENGAGE 8842 | 30 | | | | | 22.2 | | 27.0 |
| PP 1105 E1 | 70 | 75 | 75 | 75 | 75 | 75 | 70 | 70 |
| FPC | | 2.8 | 2.8 | 2.8 | 2.8 | 2.8 | 3.0 | 3.0 |
| Notched Izod Impact @ C. (ft-lb/in) | | | | | | | | |
| 21 | 1.80 | 2.5 | NB | 3.1 | NB | NB | NB | NB |
| 0 | 0.99 | 1.2 | 1.6 | 1.4 | 2.1 | 2.6 | NB | NB |
| −18 | 0.81 | 0.9 | 1.1 | 1.0 | 1.3 | 1.4 | 1.8 | 2.5 |
| −29 | 0.64 | 0.9 | 1.1 | 0.8 | 1.2 | 1.3 | 1.8 | 1.8 |
| −40 | 0.84 | 0.7 | 0.9 | 0.8 | 1.0 | 1.1 | 1.5 | 1.4 |
| Flexural Modulus (Kpsi) @ 0.05 in/min | | | | | | | | |
| 1% Secant | 118 | 107 | 106 | 110 | 109 | 115 | 92 | 96 |
| Tangent | 123 | 113 | 112 | 114 | 113 | 117 | 97 | 99 |
| MFR (g/10 min) | 17.4 | 17.1 | 17.4 | 18.9 | 18.0 | 17.5 | 14.5 | 16.0 |

TABLE 16-continued

| Wt % C$_2$ | 16.5 | 18.65 | 14.32 | 14.32 | 13.324 | 12.66 | 11.3 | 10.498 |
|---|---|---|---|---|---|---|---|---|
| F2 | 0.0192 | 1.703 | >2.679 | 0.699 | >1.839 | >1.366 | >0.043 | >0.0219 |
| MFR * FM | 2025 | 1829 | 1844 | 2079 | 1962 | 2012 | 1334 | 1536 |

Note:
In Table 16 above certain inventive blends had an Impact strength greater than measurable in the Notched Izod Impact strength at 21 C. These are designated as NB (No Break) in the table above. For the calculation of the F2 values these impact strengths are set to be greater then 12 ft. lb

TABLE 17

| | Example | | | | | | | | | | | |
|---|---|---|---|---|---|---|---|---|---|---|---|---|
| | 26A | 26B | 27A | 27B | 26C | 26D | 27C | 27D | 28A | 28B | 29A | 29B |
| ECD 321 | 30 | | 27 | | 30 | | 27 | | 30 | | 27 | |
| ECD 411 | | 30 | | 27 | | 30 | | 27 | | 30 | | 27 |
| FPC | | | 3 | 3 | | | 3 | 3 | | | 3 | 3 |
| PP 1024 E4 | | | | | 70 | 70 | 70 | 70 | | | | |
| PP 1074 E5 | | | | | | | | | 70 | 70 | 70 | 70 |
| PP 2252 | 70 | 70 | 70 | 70 | | | | | | | | |
| Notched Izod Impact @ C. (ft-lb/in) | | | | | | | | | | | | |
| 21 | 4.5 | 2.1 | 6.0 | 3.4 | 2.5 | 0.7 | 2.4 | 0.9 | 1.0 | 0.5 | 2.1 | 0.7 |
| 0 | 0.9 | 0.6 | 1.0 | 0.7 | 0.6 | 0.4 | 0.7 | 0.5 | 0.5 | 0.3 | 0.4 | 0.4 |
| −18 | 0.6 | 0.5 | 0.5 | 0.4 | 0.5 | 0.4 | 0.3 | 0.4 | 0.4 | 0.4 | 0.4 | 0.4 |
| −29 | 0.5 | 0.4 | 0.5 | 0.4 | 0.4 | 0.4 | 0.4 | 0.4 | 0.4 | 0.4 | 0.4 | 0.4 |
| Flexural Modulus (Kpsi) @ 0.05 in/min | | | | | | | | | | | | |
| 1% Secant | 159 | 165 | 157 | 120 | 150 | 157 | 149 | 147 | 156 | 156 | 144 | 148 |
| Tangent | 161 | 170 | 155 | 121 | 147 | 157 | 153 | 147 | 158 | 150 | 145 | 152 |
| MFR (g/10 min) | 3.7 | 5.3 | 3.6 | 5.0 | 7.0 | 9.4 | 7.1 | 9.6 | 9.7 | 13.3 | 9.6 | 12.8 |
| Wt % C$_2$ | 27.15 | 27.15 | 24.88 | 24.88 | 27.15 | 27.15 | 24.88 | 24.88 | 27.15 | 27.15 | 24.88 | 24.88 |
| F2 | 0.261 | 0.122 | 0.736 | 0.417 | 0.145 | 0.039 | 0.294 | 0.114 | 0.055 | 0.031 | 0.260 | 0.081 |
| MFR * FM | 583 | 868 | 570 | 602 | 1054 | 1474 | 1050 | 1407 | 1514 | 2079 | 1379 | 1894 |

TABLE 18

| | Comparative | NI | FM | Example | NI | FM | NI ratio | FM ratio |
|---|---|---|---|---|---|---|---|---|
| Table 7 | Ex A | 2.3 | 106 | Ex B | 3.161 | 111 | 1.37 | 0.95 |
| | | | | Ex C | 8.236 | 107 | 3.58 | 0.99 |
| | | | | Ex D | 7.624 | 106 | 3.31 | 1.00 |
| | | | | Ex E | 5.98 | 107 | 2.60 | 0.99 |
| | | | | Ex F | 11.62 | 99 | 5.05 | 1.07 |
| | Ex G | 1.638 | 125 | Ex H | 3.244 | 113 | 1.98 | 1.11 |
| | | | | Ex I | 9.772 | 106 | 5.97 | 1.18 |
| | | | | Ex J | 12.98 | 99 | 7.92 | 1.26 |
| | | | | Ex K | 12.38 | 99 | 7.56 | 1.26 |
| | | | | Ex L | 13.21 | 93 | 8.06 | 1.34 |
| Table 8, 9, 10 | Ex 1D | 3 | 144 | Ex 2E | 13.2 | 145 | 4.40 | 0.99 |
| | | | | Ex 2F | 12.4 | 156 | 4.13 | 0.92 |
| | | | | Ex 2G | 13 | 149 | 4.33 | 0.97 |
| | Ex 1E | 5.2 | 130 | Ex 2A | 13.6 | 129 | 2.62 | 1.01 |
| | | | | Ex 2B | 13.5 | 133 | 2.60 | 0.98 |
| | | | | Ex 2C | 14.1 | 122 | 2.71 | 1.07 |
| | Ex 1C | 4.1 | 111 | Ex 3A | 14.1 | 106 | 3.44 | 1.05 |
| | | | | Ex 3B | 14.7 | 109 | 3.59 | 1.02 |
| | Ex 1B | 3.9 | 125 | Ex 3C | 14.5 | 125 | 3.72 | 1.00 |
| | | | | Ex 3D | 14.4 | 121 | 3.69 | 1.03 |
| | Ex 1A | 3.7 | 143 | Ex 3F | 11.6 | 148 | 3.14 | 0.97 |
| | | | | Ex 3G | 11.3 | 152 | 3.05 | 0.94 |
| Table 11 | Ex 4A | 4.9 | 138 | Ex 4E | 16 | 132 | 3.27 | 1.05 |
| | Ex 4B | 1.6 | 146 | Ex 4F | 4.7 | 131 | 2.94 | 1.11 |
| | Ex 4C | 0.9 | 138 | Ex 4G | 4.1 | 122 | 4.56 | 1.13 |
| | Ex 4D | 1 | 138 | Ex 4H | 3.5 | 124 | 3.50 | 1.11 |

TABLE 18-continued

| | Comparative | NI | FM | Example | NI | FM | NI ratio | FM ratio |
|---|---|---|---|---|---|---|---|---|
| Table 12 | Ex 8A | 2.33 | 106 | Ex 9A | 3.16 | 111 | 1.36 | 0.95 |
| | | | | Ex 9C | 8.24 | 107 | 3.54 | 0.99 |
| | | | | Ex 9E | 7.62 | 106 | 3.27 | 1.00 |
| | | | | Ex 9G | 5.99 | 107 | 2.57 | 0.99 |
| | | | | Ex 9I | 11.62 | 99 | 4.99 | 1.07 |
| | Ex 8B | 1.64 | 125 | Ex 9B | 3.24 | 113 | 1.98 | 1.11 |
| | | | | Ex 9D | 9.77 | 106 | 5.96 | 1.18 |
| | | | | Ex 9F | 12.985 | 99 | 7.92 | 1.26 |
| | | | | Ex 9H | 12.38 | 99 | 7.55 | 1.26 |
| | | | | Ex 9J | 13.216 | 93 | 8.06 | 1.34 |
| Table 13 | Ex 11C | 1 | 156 | Ex 11G | 1.9 | 147 | 1.90 | 1.06 |
| | Ex 11F | 0.9 | 161 | Ex 11H | 1.6 | 158 | 1.78 | 1.02 |
| | Ex 11B | 1 | 122 | Ex 15A | 1.9 | 104 | 1.90 | 1.17 |
| | Ex 11E | 1 | 117 | Ex 15B | 1.9 | 105 | 1.90 | 1.11 |
| | Ex 14C | 0.8 | 137 | Ex 15C | 2.2 | 142 | 2.75 | 0.96 |
| | Ex 14E | 0.5 | 142 | Ex 15D | 2.3 | 139 | 4.60 | 1.02 |
| Table 14 | Ex 18A | 1.83 | 173 | Ex 19A | 2.98 | 155 | 1.63 | 1.12 |
| Table 15 | Ex 22C | 1.3 | 120 | Ex 23C | 8.4 | 106 | 6.46 | 1.13 |
| | Ex 22D | 5.2 | 104 | Ex 23D | 12.7 | 107 | 2.44 | 0.97 |
| | Ex 22E | 1.3 | 112 | Ex 23E | 13.5 | 94 | 10.38 | 1.19 |
| Table 16 | Ex 28D | 0.5 | 133 | Ex 29D | 0.9 | 124 | 1.80 | 1.07 |
| | Ex 24C | 0.69 | 123 | Ex 25C | 2.5 | 107 | 3.62 | 1.15 |
| | Ex 24D | 0.92 | 117 | Ex 25D | 12 | 106 | 13.04 | 1.10 |
| | Ex 24E | 0.82 | 117 | Ex 25E | 3.1 | 110 | 3.78 | 1.06 |
| | Ex 24F | 1 | 116 | Ex 25F | 12 | 109 | 12.00 | 1.06 |
| | Ex 24G | 1.3 | 121 | Ex 25G | 12 | 109 | 9.23 | 1.11 |
| | Ex 24H | 1.4 | 103 | Ex 25H | 12 | 92 | 8.57 | 1.12 |
| | Ex 24I | 1.8 | 118 | Ex 25I | 12 | 96 | 6.67 | 1.23 |
| Table 17 | Ex 26A | 4.5 | 159 | Ex 27A | 6 | 157 | 1.33 | 1.01 |
| | Ex 26B | 2.1 | 165 | Ex 27B | 3.4 | 120 | 1.62 | 1.38 |
| | Ex 26C | 2.5 | 150 | Ex 27C | 2.4 | 149 | 0.96 | 1.01 |
| | Ex 26D | 0.7 | 157 | Ex 27D | 0.9 | 149 | 1.29 | 1.05 |
| | Ex 28A | 1 | 156 | Ex 29A | 2.1 | 144 | 2.10 | 1.08 |
| | Ex 28B | 0.5 | 156 | Ex 29B | 0.7 | 148 | 1.40 | 1.05 |

What is claimed is:

1. A composition comprising:
   a) polypropylene having a melting point of 110° C. or more;
   b) ethylene α-olefin polymer in which the α-olefin is $C_4$ or higher; and
   c) propylene polymer, having 60 wt % or more units derived from propylene, including isotactically arranged propylene derived sequences and a further having a heat of fusion less than 45 J/g, wherein the composition has:
   d) a Notched Izod @ 21° C. of 2.5 or more; and
   e) F2 greater than 2, wherein F2 is defined as (Notched Izod)×(wt % $C_2$- 8.5)$^2$/[(wt % EE–18)$^{3.5}$].

2. A composition comprising:
   a) polypropylene having a melting point of 110° C. or more;
   b) a random ethylene α-olefin polymer in which the α-olefin is $C_4$ or higher; and
   c) propylene polymer, having 60 wt % or more units derived from propylene, including isotactically arranged propylene derived sequences and further having a heat of fusion less than 45 J/g.

3. A composition comprising:
   a) polypropylene having a melting point of 110° C. or more;
   b) ethylene α-olefin polymer in which the α-olefin is $C_4$ or higher, having no more than 1 wt % units derived from a diene; and
   c) propylene polymer, having 60 wt % or more units derived from propylene, including isotactically arranged propylene derived sequences and further having a heat of fusion less than 45 J/g.

4. A composition comprising:
   a) polypropylene having a melting point of 110° C. or more, present in the composition in an amount greater than 70 wt %;
   b) ethylene α-olefin polymer in which the α-olefin is $C_4$ or higher;
   c) propylene polymer, having 60 wt % or more units derived from propylene, including isotactically arranged propylene derived sequences and further having a heat of fusion less than 45 J/g;
   d) Melt Flow Rate of about 20 g/10 mm. or more;
   e) Notched Izod of about 2.5 ft-lb/in or more; and
   f) Flexural Modulus of about 100 kpsi or more.

5. A composition comprising:
   a) a continuous phase and a dispersed phase,
   b) a thermoplastic component present in at least a portion of the continuous phase that includes polypropylene having a melting point of 110° C. or more;
   c) an elastomeric component present in at least a portion of the dispersed phase that includes an ethylene α-olefin polymer in which the α-olefin is $C_4$ or higher;
   d) propylene polymer, having 60 wt % or more units derived from propylene, including isotactically arranged propylene derived sequences and a melting point less than 105° C.;
   e) Melt Flow Rate of about 20 g/10 mm. or more, measured according to ASTM-1238 @ 230° C. using 2.16 kg;
   f) Notched Izod of about 2.5 ft-lb/in or more; and
   g) Flexural Modulus of about 100 kpsi or more.

6. A composition comprising:
   a) a polypropylene component, present in said composition as a continuous phase, said polypropylene component having a melting point Tm ≧110° C., said polypropylene component present in said composition in an amount of 70 wt % or more;

b) a modifier component, said modifier component being a dispersed phase in said hetero phase polymer composition, said modifier component comprising at least 50 percent by weight of the total modifier component being an ethylene α-olefin polymer in which the α-olefin is $C_4$ or higher and in which the density is less than 0.9 g/ml; and c) a compatibilizer component, present in said hetero phase polymer composition in a compatibilizer amount, said compatibilizer having a ΔHf <45 J/g, said compatibilizer component having propylene derived sequences co-crystallizable with the polypropylene component of a).

7. The composition of claim 1, in which the composition has a Melt Flow Rate of about 20 g/10 mm. or more.

8. The composition of claim 1, in which the composition has a Notched Izod of about 2.5 ft-lb/in or more.

9. The composition of claim 1, in which the composition has a Flexural Modulus of about 100 kpsi or more.

10. The composition of claim 1, in which the polypropylene having a melting point of 110° C. or more is present in the composition in an amount greater than 70 wt %.

11. The composition of claim 1, in which the polypropylene having a melting point of 110° C. or more is present in the composition in an amount greater than 75 wt %.

12. The composition of claim 1, in which the polypropylene having a heat of fusion less than 45 J/g and 60 wt % or more units derived from propylene, including isotactically arranged propylene derived sequences, is present in the composition in an amount of from about 1 to about 15 wt %.

13. The composition of claim 1, in which the ethylene α-olefin polymer is present in the composition in an amount of from about 10 to about 30 wt %.

14. The composition of claim 1, in which the polypropylene having a melting point of 110° C. or more has a Melt Flow Rate of from about 20 to 100 g/10 mm.

15. The composition of claim 1, in which the polypropylene having a melting point of 110° C. or more has a Melt Flow Rate of from about 40 to 80 g/10 mm.

16. The composition of claim 1, further comprising one or more additives selected from the group consisting of a lubricant, antistatic agent, slip agent, anti-block agent, colorant, metal deactivator, mold release agent, filler, reinforcement, fluorescent whitening agent and biostabilizer.

17. The composition of claim 1, further comprising a pigment.

18. The composition of claim 1, further comprising a colored pigment.

19. The composition of claim 1, in which the composition forms part of an exterior car component.

20. The composition of claim 1, in which the composition forms part of bumper fascia.

21. The composition of claim 1, wherein said ethylene α-olefin polymer is substantially free of propylene crystallinity.

22. The composition of claim 2, wherein said random ethylene α-olefin polymer is substantially free of propylene crystallinity.

23. The composition of claim 3, wherein said ethylene α-olefin polymer is substantially free of propylene crystallinity.

24. The composition of claim 4, wherein said ethylene α-olefin polymer is substantially free of propylene crystallinity.

25. The composition of claim 5, wherein said ethylene α-olefin polymer is substantially free of propylene crystallinity.

26. The composition of claim 6, wherein said ethylene α-olefin polymer is substantially free of propylene crystallinity.

* * * * *